(12) United States Patent
Zhong et al.

(10) Patent No.: US 11,411,436 B2
(45) Date of Patent: Aug. 9, 2022

(54) WIRELESS ELECTRIC ENERGY TRANSMISSION SYSTEM FOR REALIZING PFC THROUGH SECONDARY SIDE MODULATION

(71) Applicant: ZHEJIANG UNIVERSITY, Hangzhou (CN)

(72) Inventors: Wenxing Zhong, Hangzhou (CN); Hao Li, Hangzhou (CN); Dehong Xu, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/535,588

(22) Filed: Nov. 25, 2021

(65) Prior Publication Data

US 2022/0085657 A1    Mar. 17, 2022

Related U.S. Application Data

(63) Continuation of application No. PCT/CN2019/103793, filed on Aug. 30, 2019.

(30) Foreign Application Priority Data

May 28, 2019  (CN) .......................... 201910452132.0

(51) Int. Cl.
*H02J 50/12* (2016.01)
*H02M 3/335* (2006.01)
(Continued)

(52) U.S. Cl.
CPC .............. *H02J 50/12* (2016.02); *H02J 50/10* (2016.02); *H02M 1/4233* (2013.01); *H02M 1/44* (2013.01);
(Continued)

(58) Field of Classification Search
CPC ........ H02J 50/12; H02J 50/10; H02M 1/4233; H02M 1/44; H02M 3/33573;
(Continued)

(56) References Cited

U.S. PATENT DOCUMENTS 10,315,526 B2 * 6/2019 van Boheemen ....... H02M 7/48
10,454,306 B2 * 10/2019 Bae ......................... H02J 50/12
(Continued)

FOREIGN PATENT DOCUMENTS

CN      1560990 A    1/2005
CN    105846549 A    8/2016
(Continued)

OTHER PUBLICATIONS

International Search Report (PCT/CN2019/103793); dated Feb. 25, 2020.

(Continued)

*Primary Examiner* — Yusef A Ahmed
(74) *Attorney, Agent, or Firm* — W&G Law Group

(57) ABSTRACT

Disclose is a wireless electric energy transmission system for realizing PFC through secondary side modulation. According to the system, on the basis of a traditional wireless charging system topology, a traditional PFC circuit is removed, a grid voltage is turned into a 100 Hz voltage through uncontrolled rectification to directly supply power to an inverter of a primary side of a wireless charging system; an active full-bridge rectifying structure is adopted at a secondary side, and the PFC function is achieved only through secondary side modulation, wherein under the situation that a phase shift angle α of the inverter of the primary side is given.

1 Claim, 37 Drawing Sheets

(51) Int. Cl.
  *H02M 1/42*   (2007.01)
  *H02M 1/44*   (2007.01)
  *H02M 7/219*  (2006.01)
  *H02J 50/10*  (2016.01)
(52) U.S. Cl.
  CPC .................. *H02M 3/33573* (2021.05); *H02M 3/33576* (2013.01); *H02M 3/33592* (2013.01); *H02M 7/219* (2013.01)
(58) Field of Classification Search
  CPC ......... H02M 3/33576; H02M 3/33592; H02M 7/219; Y02B 70/10
  See application file for complete search history.

(56) References Cited

U.S. PATENT DOCUMENTS

| | | | | |
|---|---|---|---|---|
| 2013/0188397 A1* | 7/2013 | Wu | ........................ | H01F 38/14 363/17 |
| 2013/0293192 A1* | 11/2013 | Abe | ........................ | H02J 50/50 320/108 |
| 2015/0015197 A1* | 1/2015 | Mi | ........................ | H02J 5/005 320/108 |
| 2015/0042159 A1* | 2/2015 | Kim | ........................ | B60L 58/20 307/10.1 |
| 2015/0311724 A1* | 10/2015 | Callanan | ................ | H02J 50/90 307/104 |
| 2015/0326031 A1* | 11/2015 | Yamaguchi | ............ | H02J 7/025 307/104 |
| 2016/0176300 A1* | 6/2016 | Bucher | .................. | H02J 7/025 307/104 |
| 2017/0033586 A1* | 2/2017 | Weidner | ................ | B60L 53/126 |
| 2017/0072807 A1* | 3/2017 | Matsumoto | ............... | H02J 7/02 |
| 2017/0361723 A1* | 12/2017 | Elshaer | .................. | B60L 53/38 |
| 2018/0212463 A1* | 7/2018 | van Boheemen | ....... | H02J 50/12 |
| 2018/0236879 A1* | 8/2018 | Elshaer | .................. | B60L 53/22 |
| 2018/0294672 A1* | 10/2018 | Zhong | .................... | H01F 38/14 |
| 2019/0255966 A1* | 8/2019 | Lee | .......................... | H02J 50/10 |
| 2019/0319474 A1* | 10/2019 | Tanaka | .................... | B60L 50/75 |
| 2019/0366857 A1* | 12/2019 | Cha | ......................... | H02J 50/80 |
| 2021/0021207 A1* | 1/2021 | Choi | .................. | H02M 1/4208 |
| 2021/0091591 A1* | 3/2021 | Brelivet | ................. | H02J 50/12 |
| 2021/0188106 A1* | 6/2021 | Asa | .................... | H02M 1/4216 |
| 2021/0305844 A1* | 9/2021 | Choi | ........................ | H02J 50/80 |
| 2021/0367453 A1* | 11/2021 | Galigekere | ......... | H02M 7/5387 |
| 2021/0408923 A1* | 12/2021 | Sun | .................... | H02M 1/0058 |
| 2022/0014093 A1* | 1/2022 | Ammar | ............. | H02M 3/33576 |

FOREIGN PATENT DOCUMENTS

| | | |
|---|---|---|
| CN | 107026482 A | 8/2017 |
| CN | 108023411 A | 5/2018 |
| CN | 110061570 A | 7/2019 |
| KR | 20120077176 A | 7/2012 |
| TW | 201820759 A | 6/2018 |
| WO | 2016/064725 A1 | 4/2016 |

OTHER PUBLICATIONS

First Office Action(201910452132.0); dated May 21, 2020.
Design and Experimentation of WPT Charger for Electric City Car; Date of Mailing: Dec. 31, 2015.

* cited by examiner

WIRELESS ELECTRIC ENERGY TRANSMISSION SYSTEM FOR REALIZING PFC THROUGH SECONDARY SIDE MODULATION

CROSS-REFERENCE TO RELATED APPLICATIONS

The present application is a continuation of International Application No. PCT/CN2019/103793, filed on Aug. 30, 2019, which claims priority to Chinese Application No. 201910452132.0, filed on May 28, 2019, the contents of both of which are incorporated herein by reference in their entireties.

TECHNICAL FIELD

The present application belongs to the technical field of wireless electric energy transmission, and relates to a wireless electric energy transmission system for realizing PFC through secondary side modulation.

BACKGROUND

With the rapid development of the electric vehicle industry, wireless charging technology is attracting more and more attention due to its advantages such as safety, flexibility and convenience. The topology of a traditional wireless charging system is shown in FIG. 1. The grid voltage is rectified into a DC voltage by a PFC (Power Factor Correction) circuit to provide power to a coil through a full-bridge inverter and is then output after passing through a rectifier bridge at the receiving end of the secondary side, wherein a SS compensation grid structure is adapted at both the primary side and the secondary side.

The present application provides a wireless charging system topology for realizing PFC only through secondary side modulation without an extra PFC circuit, thereby simplifying the structure and reducing the cost.

SUMMARY

The purpose of the present application is to provide a wireless electric energy transmission system for realizing PFC through secondary side modulation, wherein the traditional PFC circuit is omitted as compared with the traditional topology, and the system has a simple structure, a high efficiency and a low cost.

The technical solution adopted by the present application is as follows:

a wireless electric energy transmission system for realizing PFC through secondary side modulation, wherein, on the basis of a traditional wireless charging system topology, a traditional PFC circuit is removed, a grid voltage is turned into a 100 Hz voltage through uncontrolled rectification to directly supply power to an inverter of a primary side of a wireless charging system; an active full-bridge rectifying structure is adopted at a secondary side, and a PFC function is achieved only through secondary side modulation.

The PFC function through secondary side modulation is specifically achieved as follows:

there are three control degrees of freedom in the system, which, in sequence, are: a phase shift angle α of the inverter of the primary side, a phase shift angle β of a rectifier of the secondary side and a phase angle γ of a control voltage $u_{gs5}$ of a top tube of a first bridge arm of the rectifier of the secondary side ahead of a control voltage $u_{gs1}$ of a top tube of a first bridge arm of the inverter of the primary side;

when the phase shift angle α of a primary side is given, the shift angle β of a secondary side is regulated according to the following formula:

$$\beta(t) = 2\arcsin\left(\frac{\pi}{4} \cdot \frac{V_O}{R_L} \cdot \frac{\pi \omega_0 M}{220\sqrt{2} \cdot \sin\frac{\alpha}{2}} \sin\omega t\right)$$

where $V_O$ is an output DC voltage, $R_L$ is an equivalent load resistance of an output end, $\omega_0 = 2\pi f_0 = 2\pi \cdot 85$ kHz is a resonance angular frequency of the system, $\omega = 2\pi f = 2\pi \cdot 50$ Hz is a grid voltage angular frequency of the system, and M is a mutual inductance value of coils of the primary side and the secondary side;

the phase angle γ is regulated according to the following formula:

$$\gamma(t) = 90° - \frac{\alpha}{2} + \frac{\beta(t)}{2}$$

on which condition, a 50 Hz harmonic wave of an input current of a rectifier bridge of the primary side is in phase with an input voltage; after filtering through an EMI filter, a voltage-current power factor of a grid side is approximate to 1.

The present application has the following beneficial effects.

Compared with the traditional topology, the traditional PFC circuit is omitted in the system of the present application, PFC can be realized only through secondary modulation, and the system has a simple structure, a high efficiency and a low cost.

DESCRIPTION OF EMBODIMENTS

The technical solution of the present application will be described in detail below.

Figure 1:
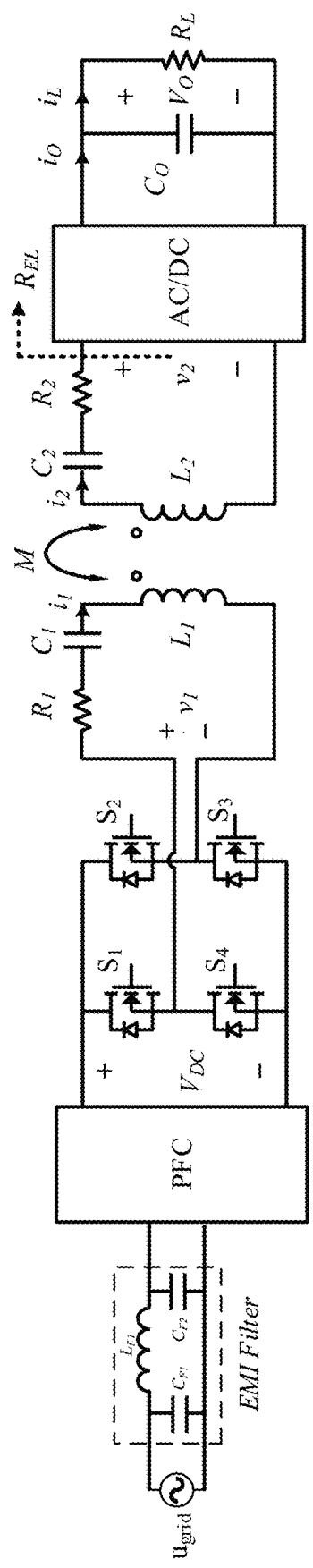
FIG. 1 is a traditional wireless charging system topology.
Figure 2:
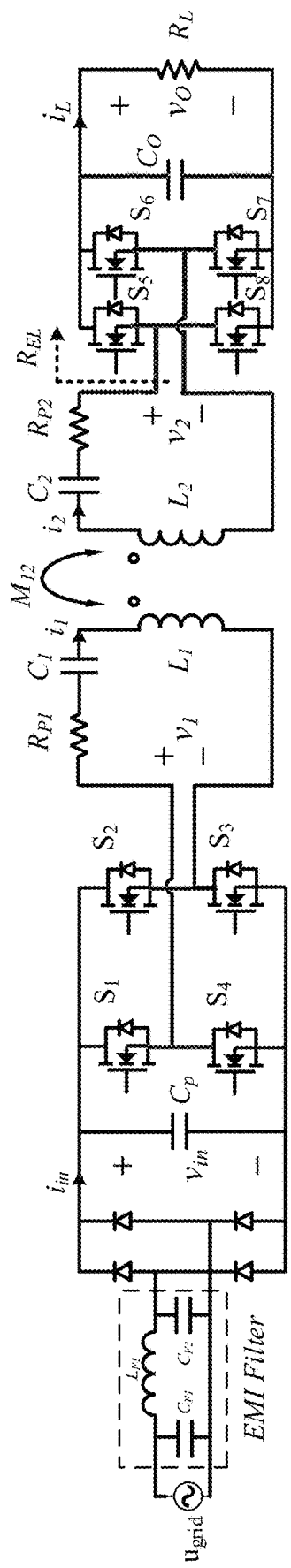
FIG. 2 is a schematic diagram of the wireless electric energy transmission system of the present application.

FIG. 2 is a schematic structural diagram of the wireless charging system of the present application; compared with the traditional wireless charging topology, the PFC circuit is omitted, and the grid voltage is turned into a 100 Hz voltage through uncontrolled rectification to directly supply power to an inverter of a primary side of the wireless charging system. The working frequency of the system is 85 kHz, an active full-bridge rectification structure is adopted at a secondary side, and a high frequency component of 85 kHz is filtered out by an EMI filter on a grid side, wherein Cp is a small-capacity high-frequency filter capacitor and Co is a low-frequency large-capacity filter capacitor. For this topology, the PFC function can be realized only by secondary side modulation.

Control Method

Figure 3:
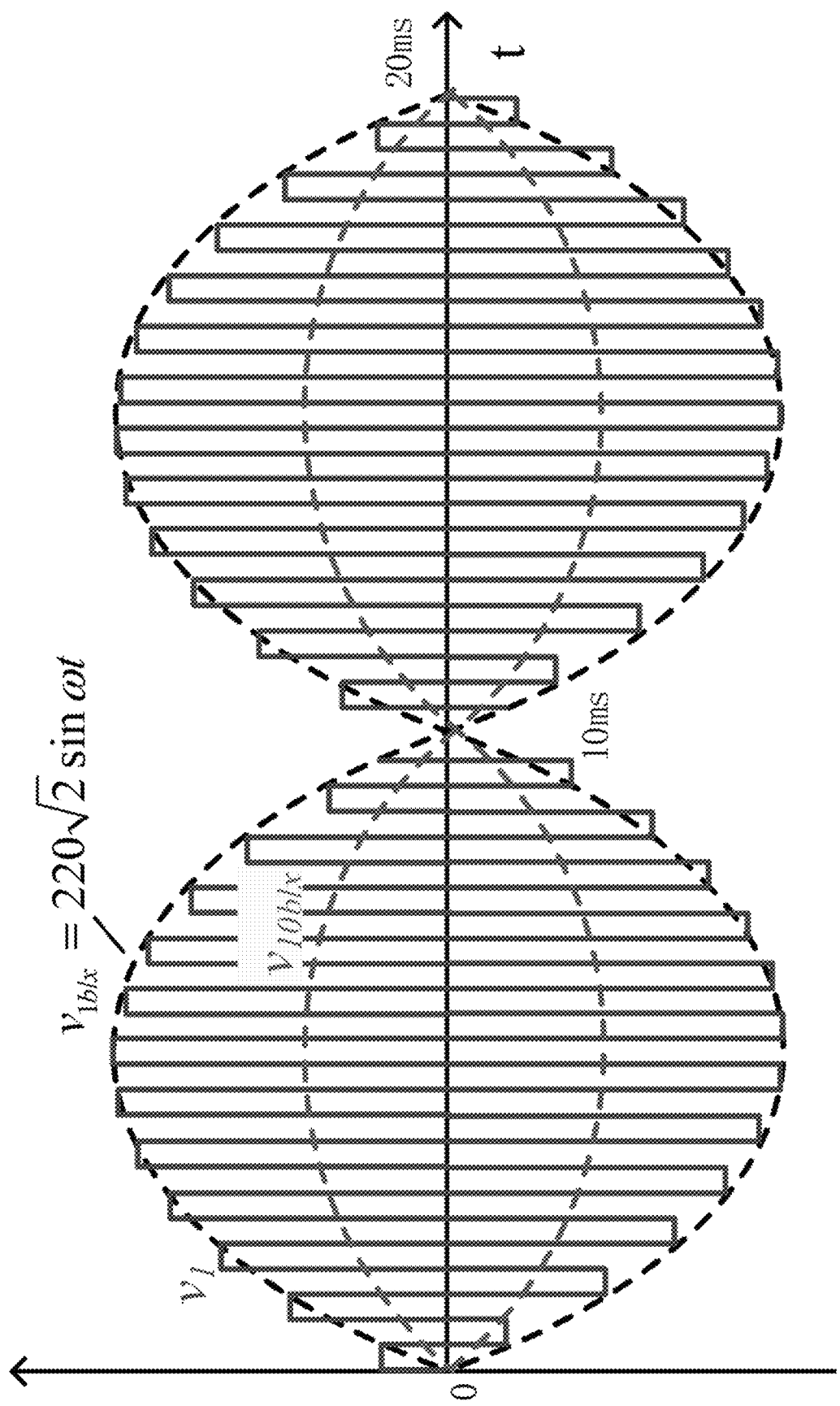
FIG. 3 shows an output voltage $v_1$ of an inverter of a primary side, its envelope $v_{1blx}$ and its fundamental component envelope $v_{10blx}$ at 85 kHz.
Figure 4:
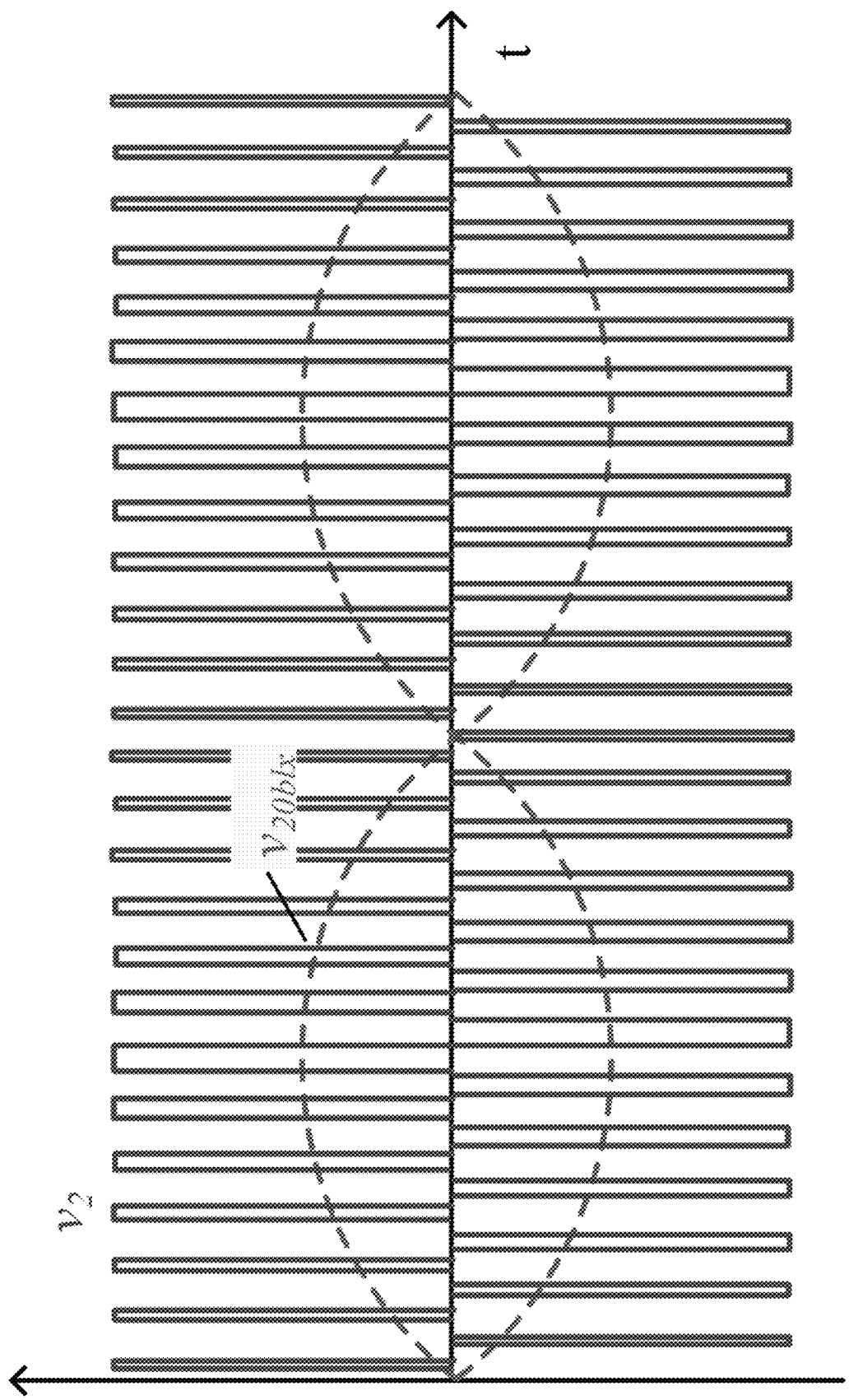
FIG. 4 shows an input voltage $v_2$ of a rectifier of a secondary side and its fundamental component envelope $V_{20blx}$ at 85 kHz.

A full-bridge phase shift is adopted at the primary side. After being rectified, the grid voltage at the primary side presents a pulsating voltage of 100 Hz, which directly supplies power to an inverter of a primary side of the wireless charging system. When the phase shift angle of the inverter is $\alpha=180$, a square wave voltage $v_1$ is output by the inverter as shown in FIG. 3, and its envelope $v_{1blx}$ is the pulsating voltage of the grid, and the envelope of a fundamental component at 85 kHz is $v_{10blx}$. $v_2$ is adjusted at a secondary side through phase shift, so that the fundamental component at 85 kHz presents a 100 Hz in-phase low-frequency pulsation, and its envelope is $V_{20blx}$, as shown in FIG. 4. Therefore, a 50 Hz harmonic wave of the input current of a rectifier bridge of the primary side is in phase with the input voltage, and after filtering through the EMI filter, the voltage-current power factor of the grid side is approximate to 1.

Figure 5:
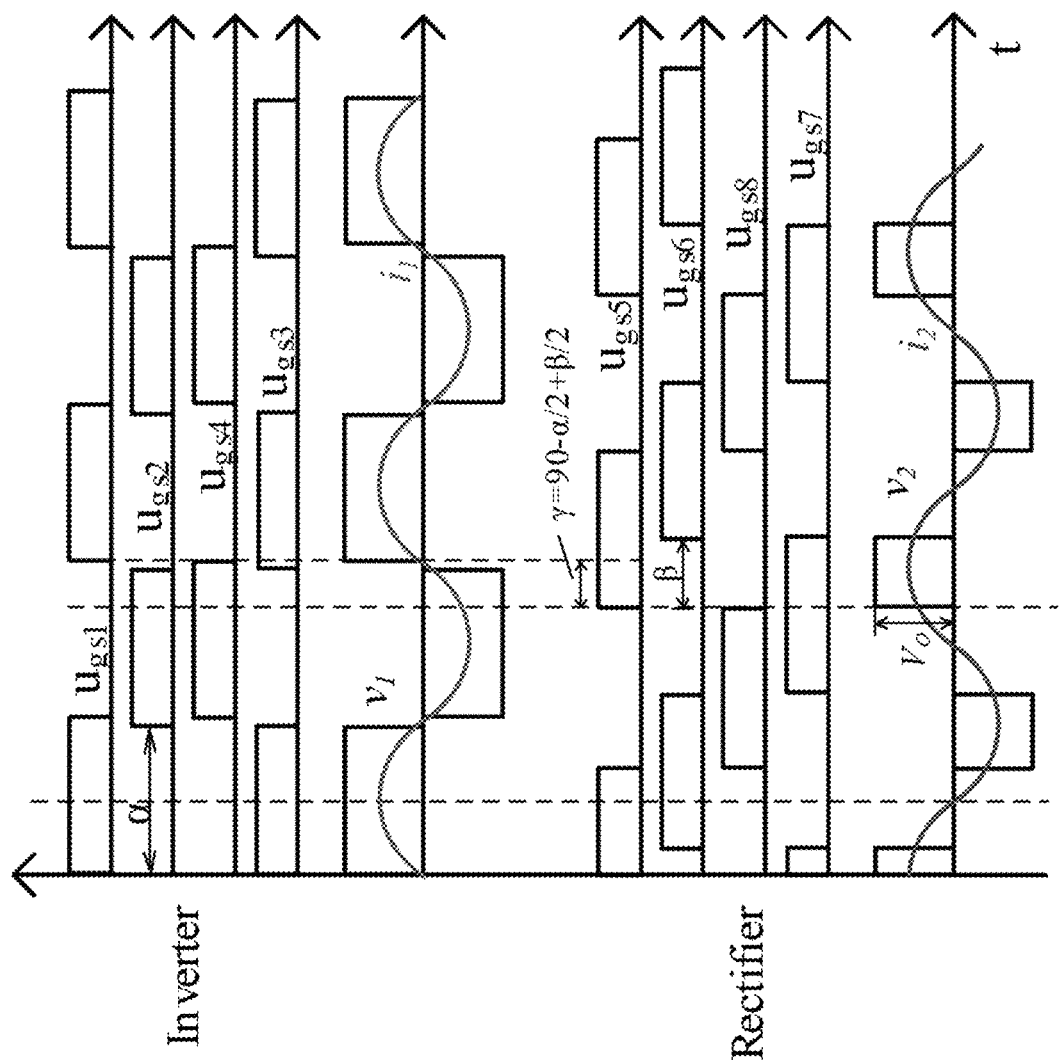
FIG. 5 shows the timing of control signals of the primary side and the secondary side.

For the wireless charging system structure shown in FIG. 2, there are three control degrees of freedom, which, in sequence, are: a phase shift angle $\alpha$ of an inverter of a primary side, a phase shift angle $\beta$ of a rectifier of the secondary side and a phase angle $\gamma$ of a control voltage of the secondary side ahead of a control voltage of the primary side. The timing of the control signals is shown in FIG. 5. The phase shift angle of the inverter of the primary side is $\alpha$, $v_1$ and $i_1$ are the output voltage and current of the inverter respectively; the phase shift angle of the rectifier of the secondary side is $\beta$, and the phase angle $\gamma$ of the upper tube $u_{gs5}$ ahead of the upper tube $u_{gs1}$ of the inverter of the primary side is $\gamma=90-\alpha/2+\beta/$, under which condition, the voltage $v_2$ of the input end of the rectifier is in phase with the current $i_2$ of the secondary side, and the angle ahead of $i_1$ and $v_1$ is 90°.

In practice, the phase shift angle $\alpha$ of the inverter is a fixed value after being determined, and the phase shift angle $\beta$ of the rectifier is modulated by low-frequency pulsation, so that the current $i_1$ of the primary side presents low-frequency pulsation, while $\gamma$ follows the $\beta$ low-frequency pulsation to ensure that the voltage $v_2$ of the input end of the rectifier is in phase with the current $i_2$ of the secondary side. For example, when $\alpha=180°$, $\beta=180°$, then $\gamma=90°$, a maximum voltage is output at this time, and the voltage $v_2$ of the input end of the rectifier is in phase with the current $i_2$ of the secondary side, and the angle ahead of $i_1$ and $v_1$ is 90°; when α=180°, β=90°, then γ=45°, which also satisfies the condition that the voltage $v_2$ of the input end of the rectifier is in phase with the current $i_2$ of the secondary side, and the angle ahead of $i_1$ and $v_1$ is 90°.

Theoretical Derivation $$V_1 = \frac{2\sqrt{2}}{\pi} \cdot 220\sqrt{2} \sin\omega t \cdot \sin\frac{\alpha}{2} \quad (1)$$

$$I_2 = \frac{V_1}{\omega_0 M} = \frac{\frac{2\sqrt{2}}{\pi} \cdot 220\sqrt{2} \sin\omega t \cdot \sin\frac{\alpha}{2}}{\omega_0 M} \quad (2)$$

where $\omega_0=2\pi f_0=2\pi \cdot 85$ kHz is a resonance angular frequency of the system, $\omega=2\pi f=2\pi \cdot 50$ Hz is the grid voltage angular frequency, α is the phase shift angle of the inverter, $V_1$ is a 85 kHz fundamental effective value of the output voltage of the inverter, $I_2$ is a current effective value of a coil in the secondary side, and M is a mutual inductance value of coils of the primary side and the secondary side.

In order that the power factor at the grid side is 1, phase-shifting modulation is implemented on the voltage of the input end of the rectifier of the secondary side so that the fundamental voltage of the rectifier of the secondary side presents 100 Hz low-frequency pulsation, and the current of the primary side also presents 100 Hz low-frequency pulsation. The 50 Hz harmonic wave of the input current of the rectifier bridge of the primary side is in phase with the input voltage. After passing through the EMI filter, the voltage-current power factor is approximate to 1.

Assuming that $$V_2 = \frac{A\sin\omega t}{\sqrt{2}} \quad (3)$$

where $V_2$ is the fundamental effective value of the voltage of the input end of the rectifier, and A is the amplitude of a 85 kHz fundamental 100 Hz envelope of the voltage of the input end of the rectifier.

Since the voltage and current are in phase at the secondary side, then.

$$P_O = \quad (4)$$

$$\frac{1}{\pi}\int_0^\pi V_2 I_2 d(\omega t) = \frac{1}{\pi}\int_0^\pi A\sin\omega t \cdot \frac{\frac{2\sqrt{2}}{\pi} \cdot 220\sqrt{2} \sin\omega t \cdot \sin\frac{\alpha}{2}}{\omega_0 M} d(\omega t) =$$

$$\frac{A \cdot 220\sqrt{2} \cdot \sin\frac{\alpha}{2}}{\pi \omega_0 M} = \frac{V_O^2}{R_L}$$

where $P_O$ is an output power, $V_O$ is an output DC voltage, and $R_L$ is a load equivalent resistance.

Therefore, the amplitude A of the low-frequency envelope can be solved, $$A = \frac{V_O^2}{R_L} \cdot \frac{\pi \omega_0 M}{220\sqrt{2} \cdot \sin\frac{\alpha}{2}} \quad (5)$$

then:

$$V_2 = \frac{2\sqrt{2}}{\pi} V_O \sin\frac{\beta(t)}{2} = \frac{A\sin\omega t}{\sqrt{2}} \quad (6)$$

$$I_1 = \frac{V_2}{\omega_0 M} = \frac{A\sin\omega t}{\sqrt{2}\,\omega_0 M} = \frac{1}{\sqrt{2}} \cdot \frac{V_O^2}{R_L} \cdot \frac{\pi}{220\sqrt{2} \cdot \sin\frac{\alpha}{2}} \cdot \sin\omega t \quad (7)$$

where β(t) is a phase shift angle of the rectifier of the secondary side, and $I_1$ is a fundamental effective value of the coil current of the primary side.

The following formulas are obtained through calculation:

$$\beta(t) = 2\arcsin\left(\frac{A\sin\omega t}{\frac{4}{\pi}V_O}\right) = 2\arcsin\left(\frac{\pi}{4} \cdot \frac{V_O}{R_L} \cdot \frac{\pi\omega_0 M}{220\sqrt{2} \cdot \sin\frac{\alpha}{2}}\sin\omega t\right) \quad (8)$$

$$\gamma(t) = 90° - \frac{\alpha}{2} + \frac{\beta(t)}{2} \quad (9)$$

$$V_O = \frac{4}{\pi} \cdot R_L \cdot \frac{220\sqrt{2}\sin\frac{\alpha}{2}\sin\frac{\beta}{2}}{\pi\omega_0 M \cdot \sin\omega t} = F(\alpha, \beta, R_L, M) \quad (10)$$

Simulation Verification

Assuming that the phase shift angle of the primary side is α=180° and the amplitude of the fundamental envelope of the input voltage of the rectifier of the secondary side is $$A = A_{max} = \frac{4}{\pi}V_O,$$

then the following formulas are obtained according to formulas (8) and (9):

$$\beta(t) = 2\arcsin(\sin\omega t) \quad (11)$$

$$\gamma(t) = \frac{\beta(t)}{2} = \arcsin(\sin\omega t) \quad (12)$$

Figure 6:
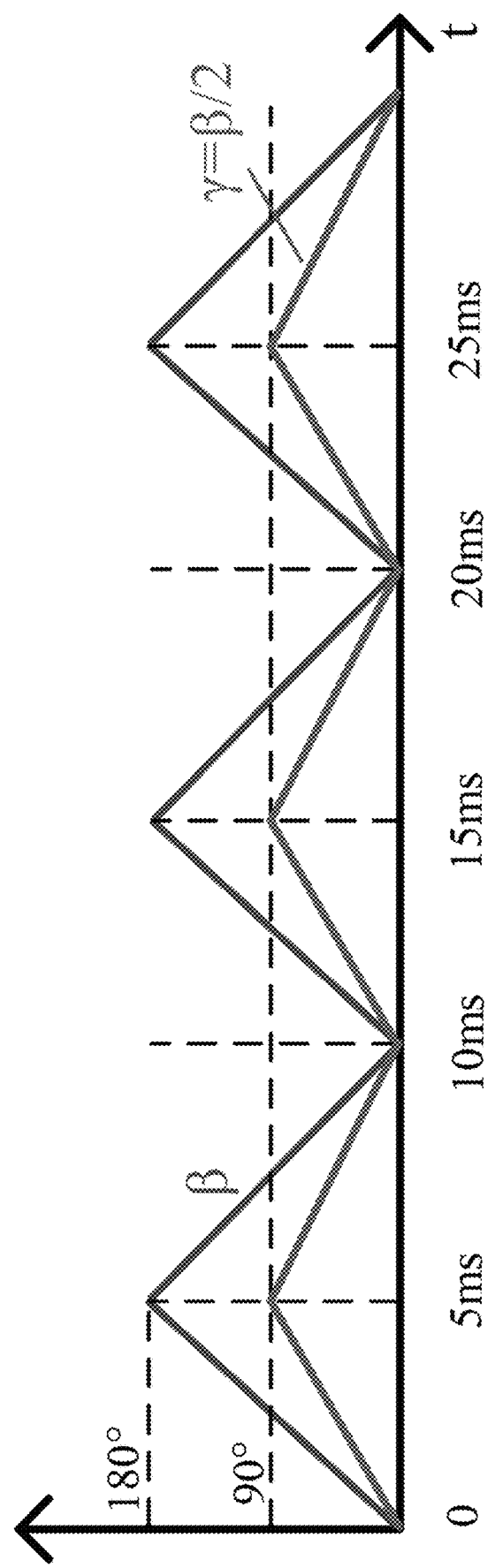
FIG. 6 shows the waveforms of β(t) and γ(t) under the condition of a maximum output voltage.

The waveforms of β(t) and γ(t) are shown in FIG. 6, with a period of 100 Hz, and the linear changes show low-frequency pulsation.

Figure 7:
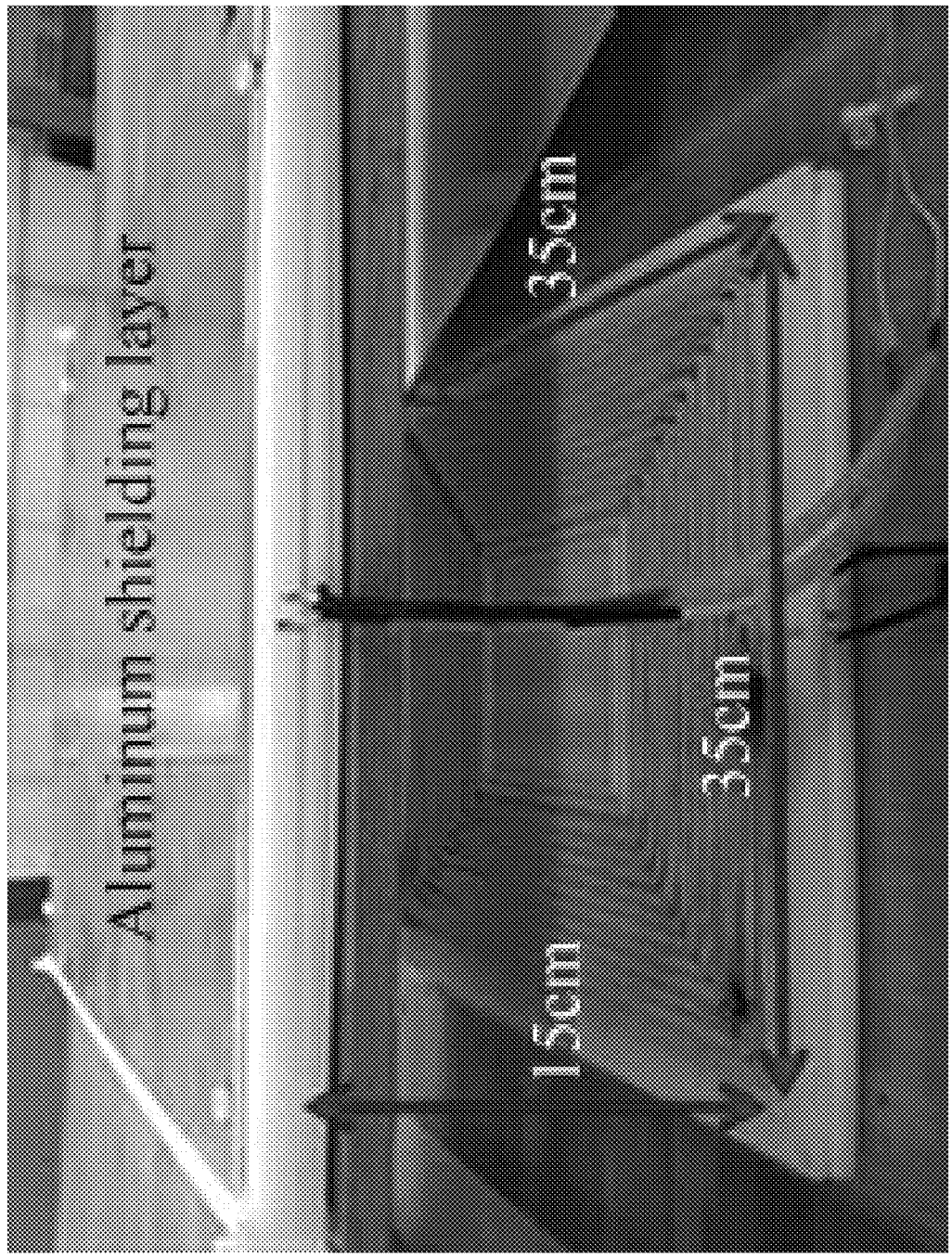
FIG. 7 shows a coil part of an experiment platform.

To verify the whole modulation mode, the block diagram of the system is shown in FIG. 2, the control waveform is shown in FIG. 5, the coil part of the experimental platform is shown in FIG. 7, and the parameters of the experimental platform are shown in Table 1.

TABLE 1

| $L_1$/uH | $L_2$/uH | $C_1$/nF | $C_2$/nF | $R_1$/Ω |
|---|---|---|---|---|
| 490 | 490 | 7.2 | 7.2 | 1 |
| $R_2$/Ω | M/uH | $f_0$/kHz | $V_o$/V | $R_L$/Ω |
| 1 | 65 | 84.73 | 180 | 50 |

The parameters $C_{F1}$, $C_{F2}$ and $L_{F1}$ of the EMI filter are selected as 1 uF, 1 uF and 600 uH in turn, and the low-capacity filter capacitor at the front end of the inverter is $C_F$=100 nF, while the high-capacity filter at the output end is $C_O$=4 mF.

The theoretical and simulation results are shown in Table 2. The output voltage of 180V is basically consistent with the simulation, and the current envelopes of the primary side and the secondary side are basically consistent, which proves that the theoretical formula is derived correctly.

TABLE 2

|  | $I_{1max}$/A | $I_{2max}$/A | Vo/V |
|---|---|---|---|
| Theory | 6.6 | 11.4 | 182 |
| Simulation | 7.1 | 10.9 | 180 |

Figure 8:
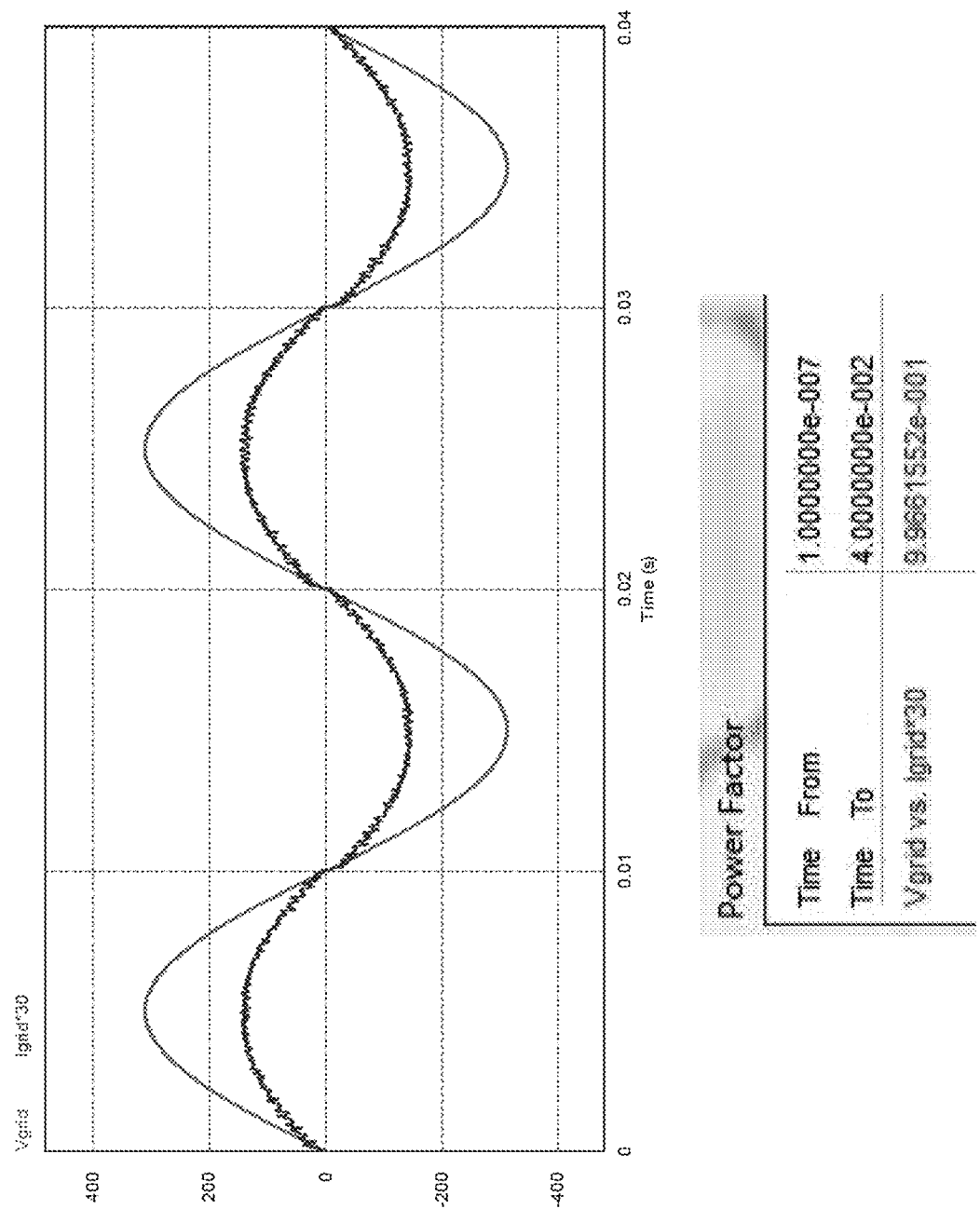
FIG. 8 shows a voltage and a current ($v_{grid}$, $i_{grid}$) and a power factor thereof at a grid side under the condition of a maximum output voltage.
Figure 9:
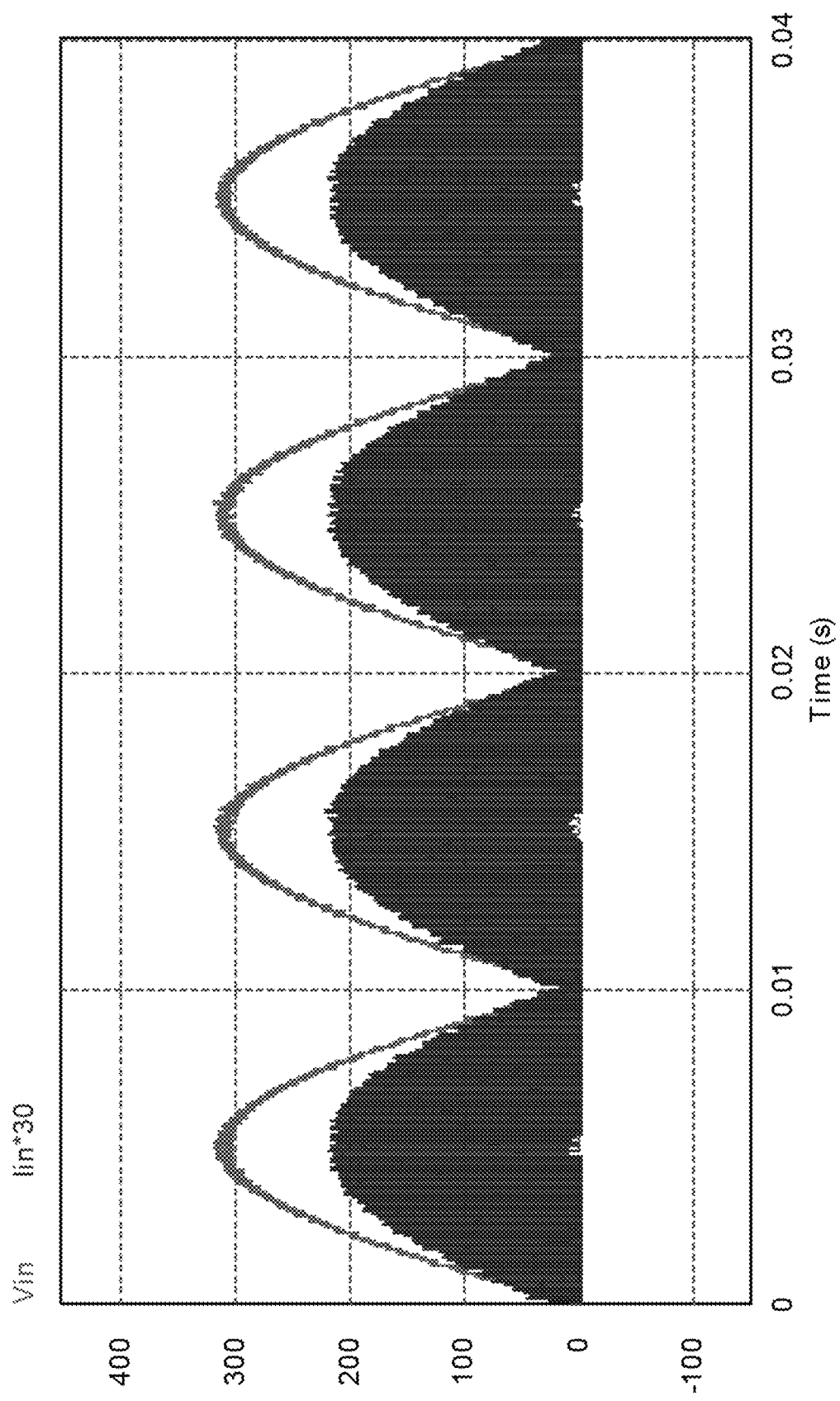
FIG. 9 shows a voltage and a current ($V_{in}$, $i_{in}$) after uncontrolled rectification under the condition of a maximum output voltage.
Figure 10:
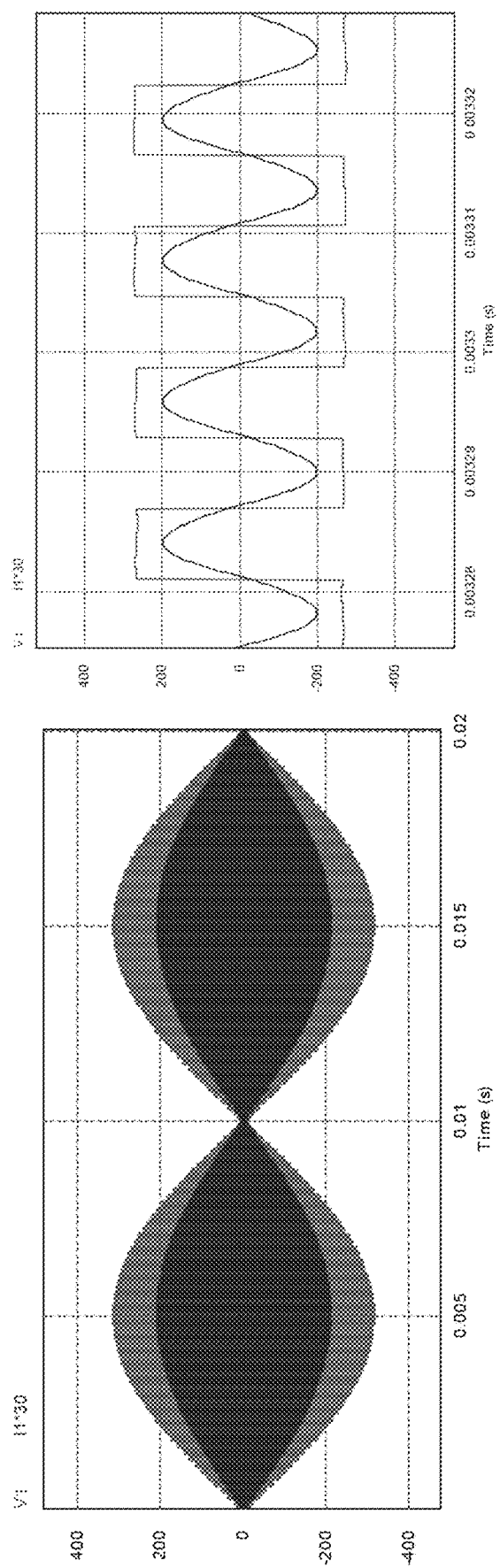
FIG. 10 shows an output voltage $V_1$, a current $i_1$ of an inverter of a primary side and amplified waveforms thereof under the condition of a maximum output voltage.
Figure 11:
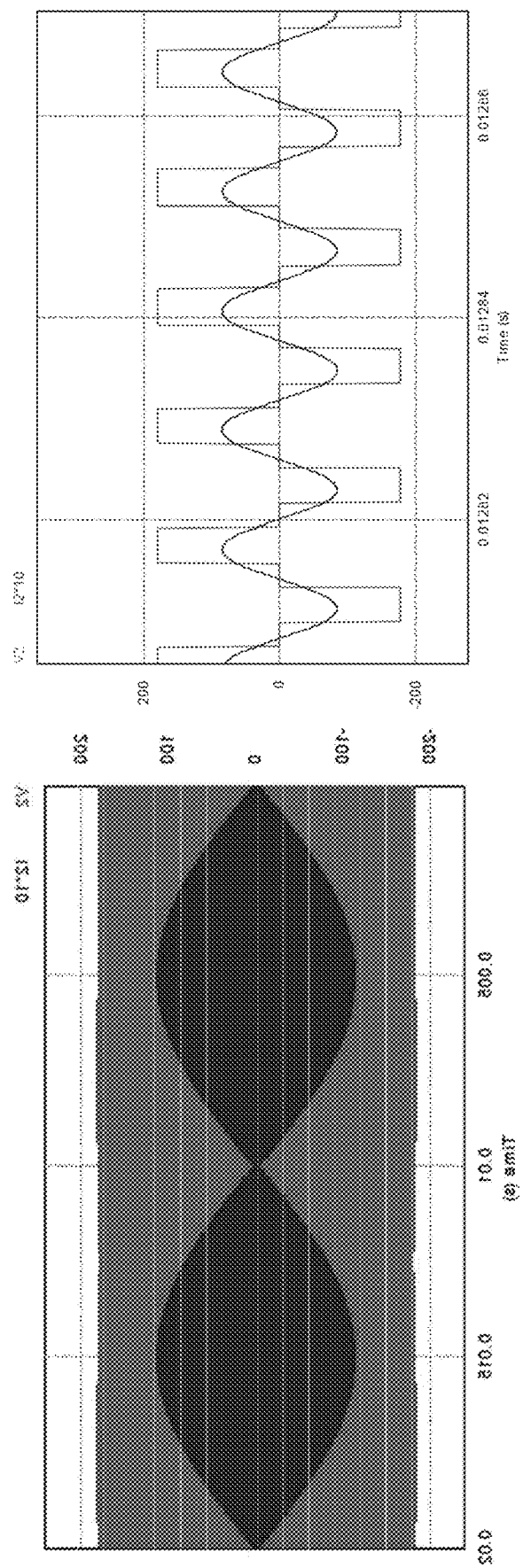
FIG. 11 shows an output voltage $V_2$, a current $i_2$ of a rectifier of the secondary side and amplified waveforms thereof under the condition of a maximum output voltage.
Figure 12:
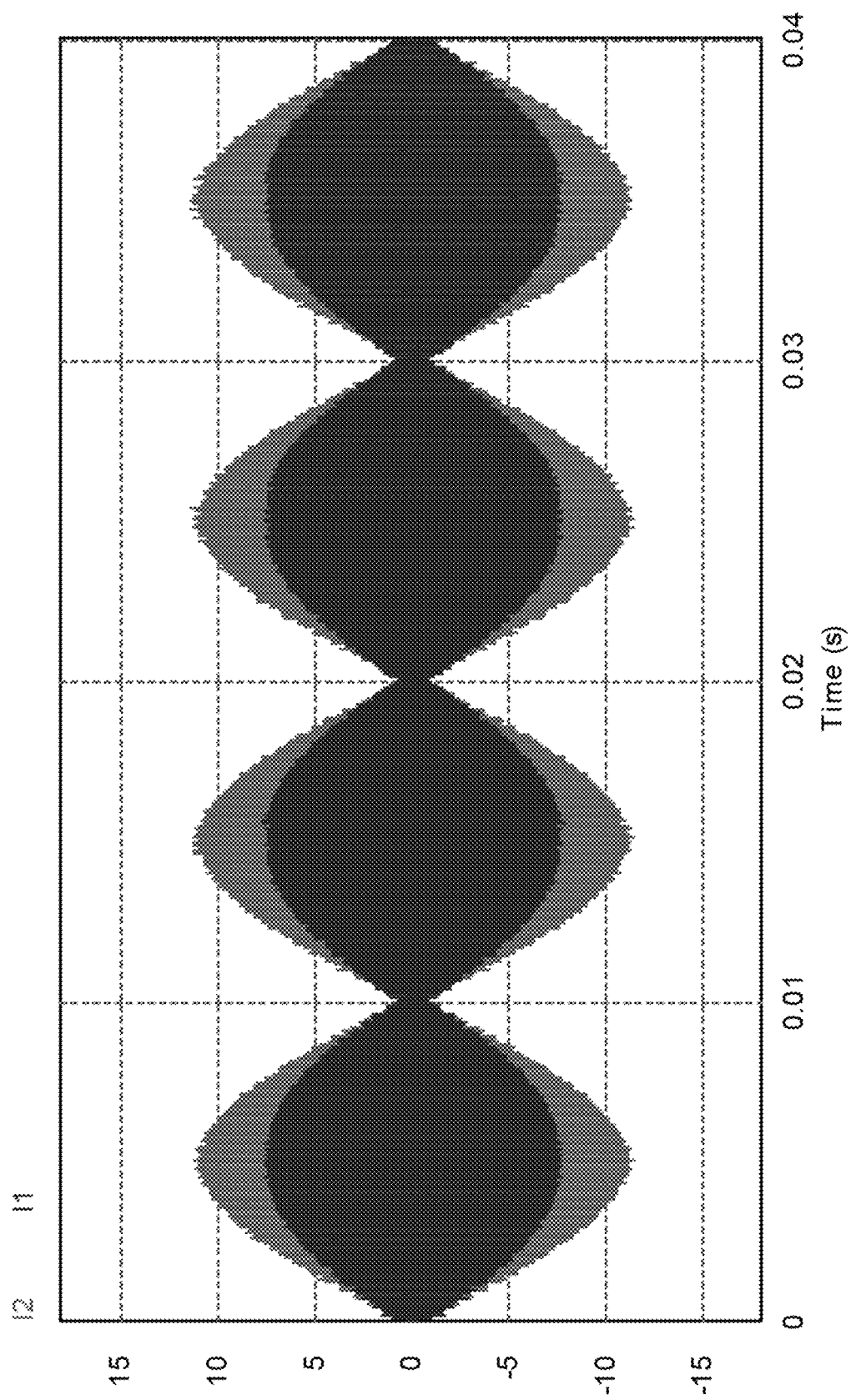
FIG. 12 shows currents $i_1$ and $i_2$ of the primary side and the secondary side under the condition of a maximum output voltage.
Figure 13:
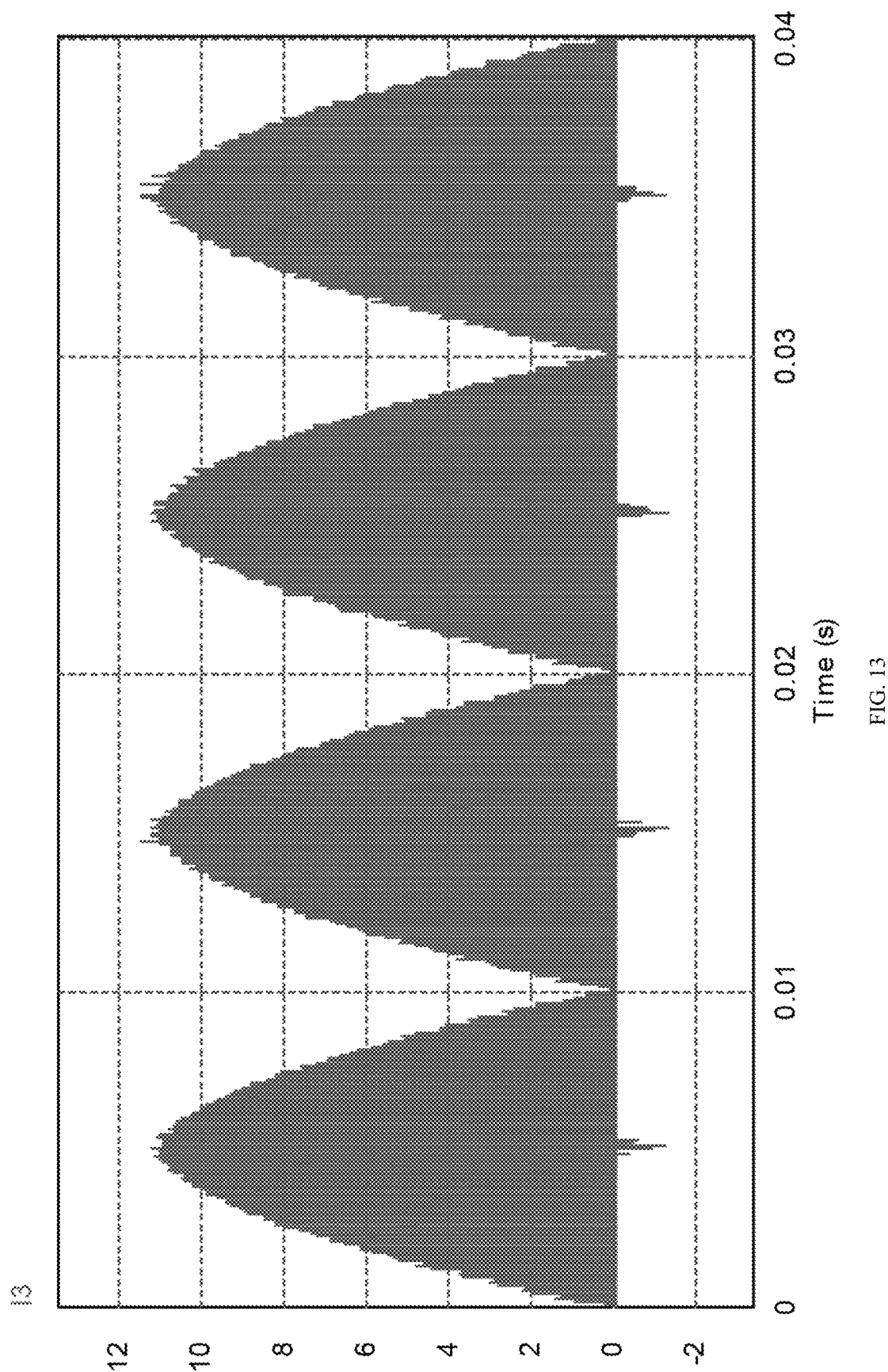
FIG. 13 shows an active rectified output current $i_3$ of the secondary side under the condition of a maximum output voltage.
Figure 14:
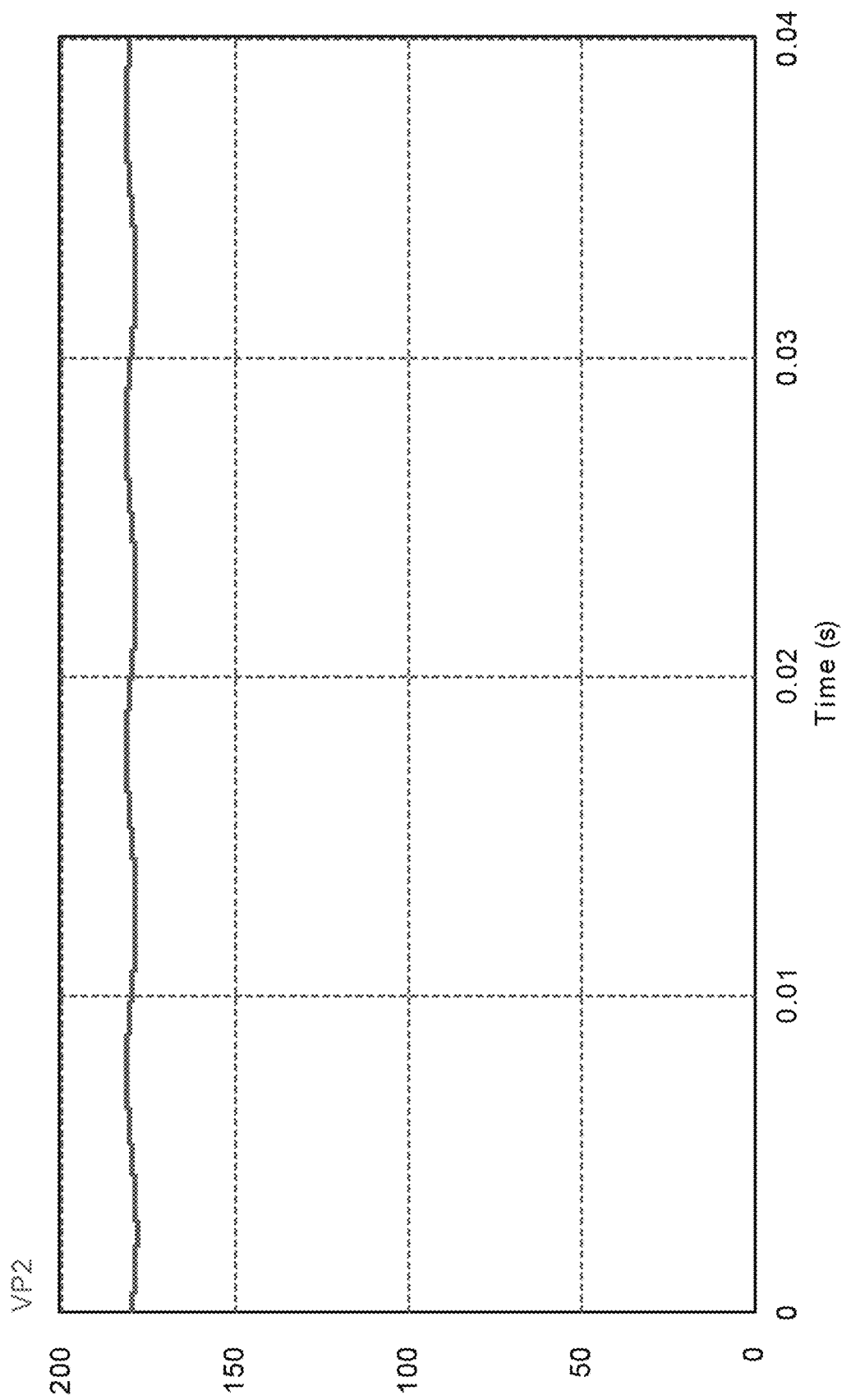
FIG. 14 shows an output DC voltage $U_O$ under the condition of a maximum output voltage.

The input voltage and current of the grid side are shown in FIG. 8, and the power factor is 0.997. After passing through an uncontrolled rectification circuit, the voltage $v_{in}$ and current $i_{in}$ are shown in FIG. 9, in which the current $i_{in}$ at 85 kHz shows a 100 Hz pulsation. The output voltage and current of the inverter are as shown in FIG. 10. Limited by an input pulsating voltage, both the output voltage $V_1$ and current $i_1$ of the inverter present a 100 Hz pulsation, the modulation frequency is 85 kHz, and the voltage and current are in the same phase. As shown in FIG. 11, the voltage $V_2$ and current $i_2$ at the input end of the rectifier of the secondary side both show a 100 Hz pulsation, and the modulation frequency is 85 kHz. The phase shift angle of the voltage $V_2$ is modulated in real time, and the voltage and current are in the same phase. The coil currents $i_1$ and $i_2$ of the primary side and the secondary side are shown in FIG. 12. After active rectification, the current waveform $i_3$ is shown in FIG. 13, showing a pulsating form, and the output voltage is as shown in FIG. 14. An average value of the output voltage is 180V, and the peak-to-peak ratio of a ripple is 1.55%.

Power Regulation Verification

According to the formula (10):

$$V_O = \frac{4}{\pi} \cdot R_L \cdot \frac{220\sqrt{2}\sin\frac{\alpha}{2}\sin\frac{\beta}{2}}{\pi\omega_0 M \cdot \sin\omega t} = F(\alpha, \beta, R_L, M)$$

The mode to adjust $V_O$ can be obtained. Assuming that $R_L$ and M are known, $V_O$ is a function of $\alpha$ and $\beta$, so there are three adjustment schemes: 1. adjust $\alpha$ and keep $\beta$ unchanged; 2. adjust $\beta$ and keep $\alpha$ unchanged; 3. adjust $\alpha$ and adjust $\beta$.

Now the adjustment to $V_O=90V$ is taken as an example for verification.

Scheme 1: adjust $\alpha$ and keep $\beta$ unchanged $$\alpha = 60° \tag{13}$$

$$\beta(t) = 2\arcsin(\sin\omega t) \tag{14}$$

$$\gamma(t) = 90° - \frac{\alpha}{2} + \frac{\beta(t)}{2} = 60° + \arcsin(\sin\omega t) \tag{15}$$

Figure 15:
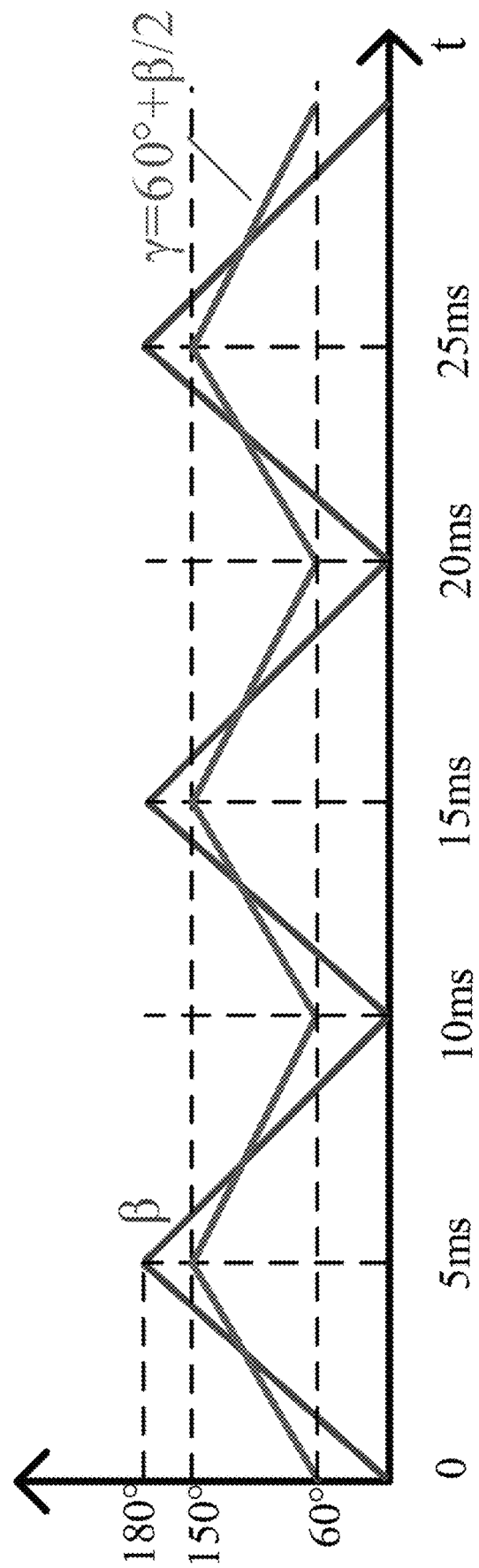
FIG. 15 shows the waveforms of $\beta(t)$ and $\gamma(t)$ in a first power control embodiment.

The waveforms of β(t) and γ(t) are as shown in FIG. 15, with a period of 100 Hz, and the linear changes show a low-frequency pulsation.

The theoretical and simulation results are shown in Table 3. The output voltage of 90V is basically consistent with the simulation, and the current envelopes of the primary side and the secondary side are basically consistent, which proves that the power can be adjusted according to the scheme 1, and the theoretical derivation is correct.

TABLE 3

|  | $I_{1max}$/A | $I_{2max}$/A | Vo/V |
|---|---|---|---|
| Theory | 3.3 | 5.7 | 90 |
| Simulation | 3.6 | 5.7 | 91 |

Figure 16:
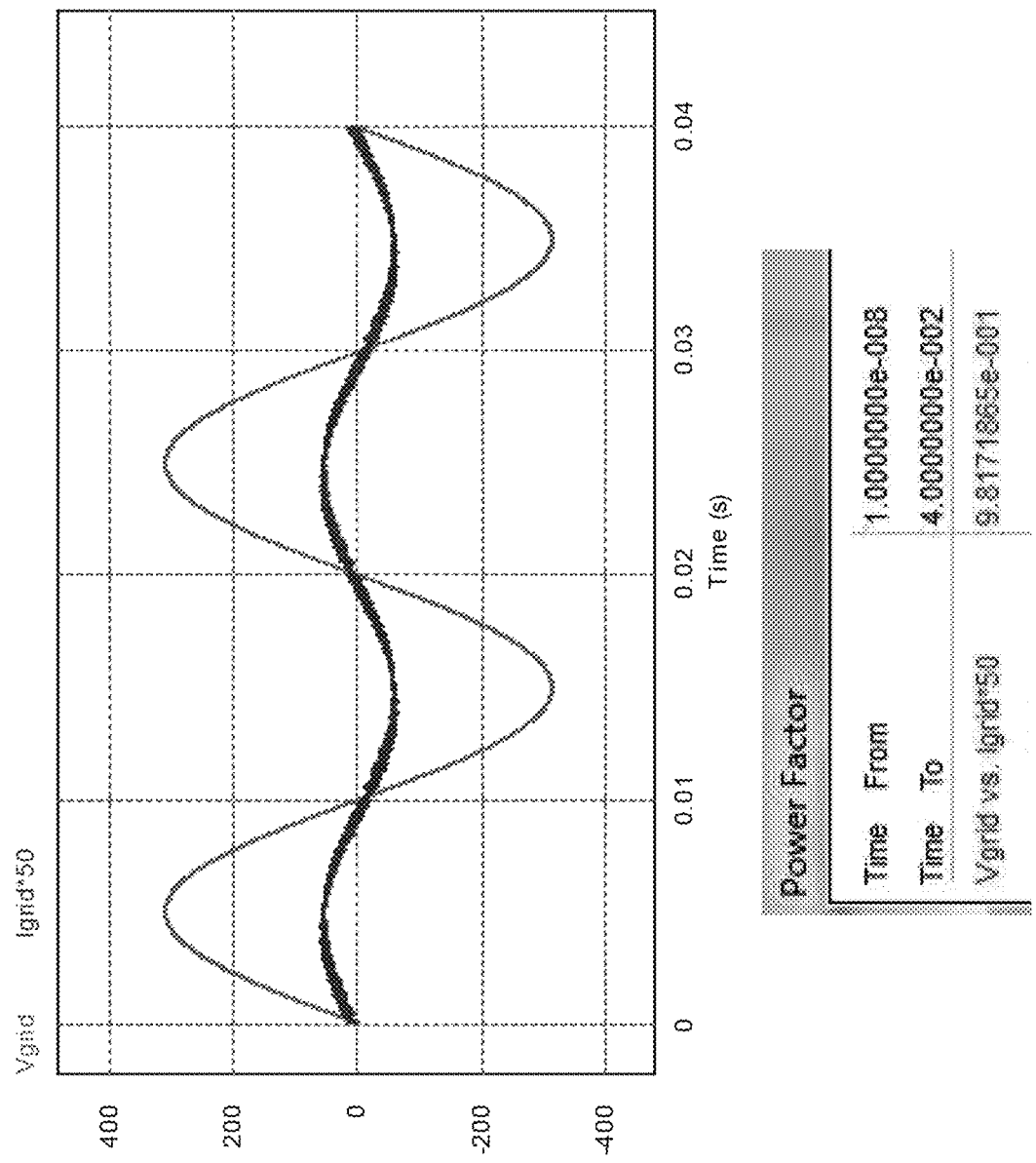
FIG. 16 shows the voltage and current ($v_{grid}$, $i_{grid}$) and a power factor thereof at the grid side in the first power control embodiment.
Figure 17:
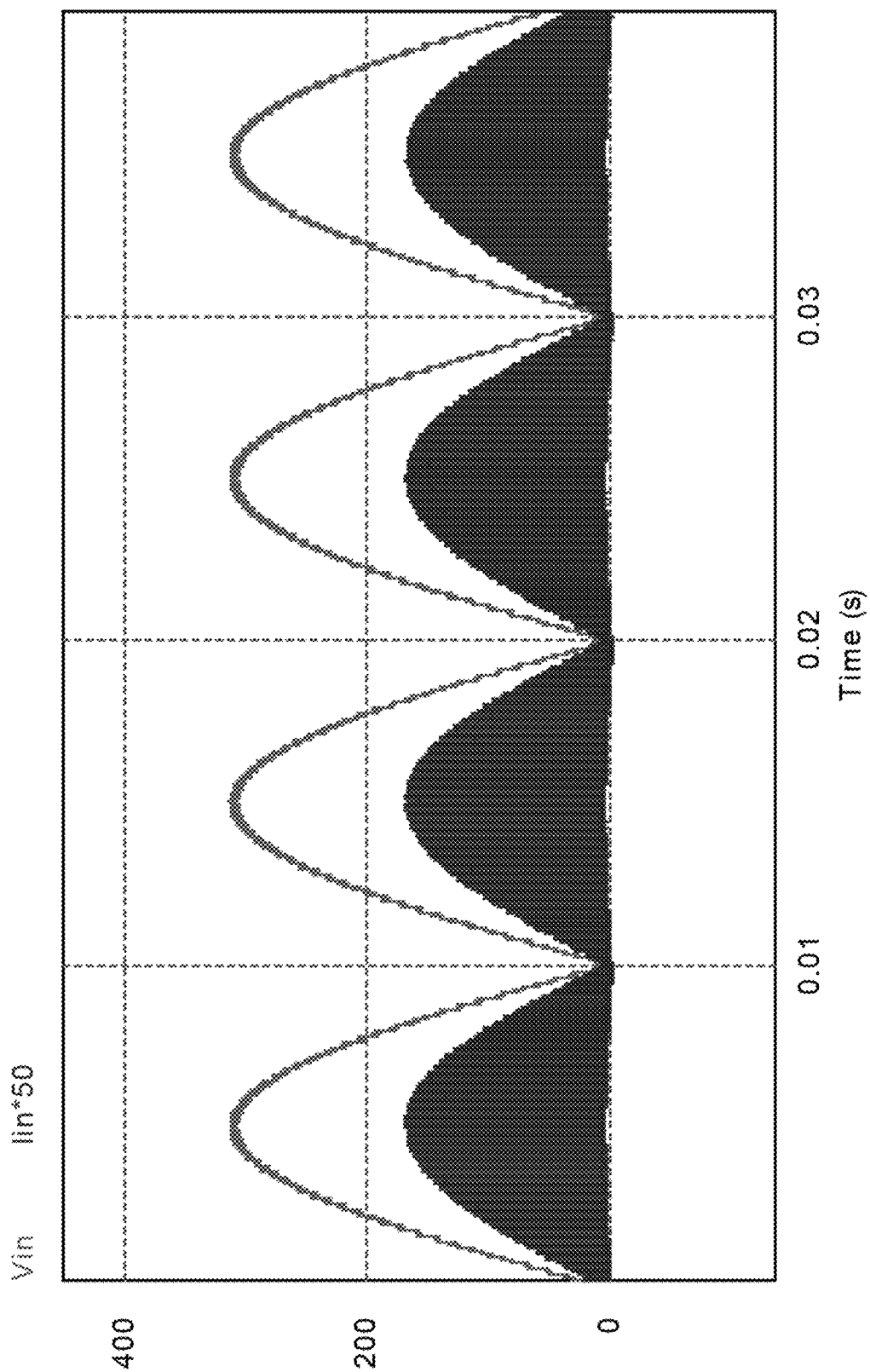
FIG. 17 shows a voltage and a current ($V_{in}$, $i_{in}$) after uncontrolled rectification in the first power control embodiment.
Figure 18:
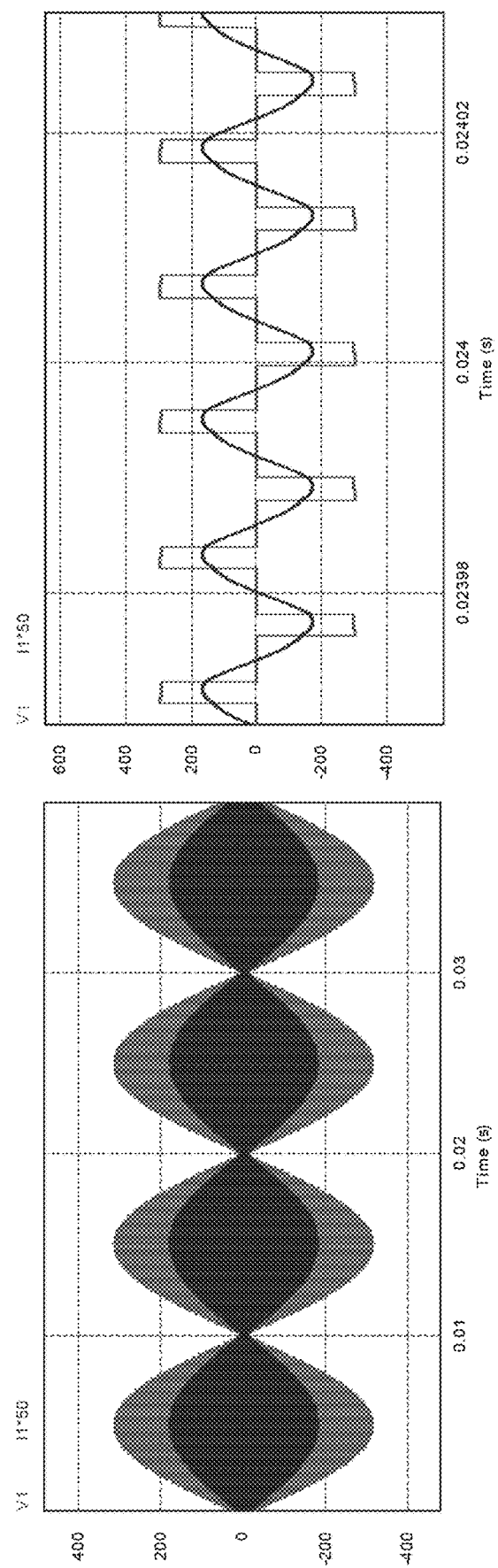
FIG. 18 shows an output voltage $V_1$, an output current $i_1$ of an inverter of a primary side and amplified waveforms thereof in the first power control embodiment.
Figure 19:
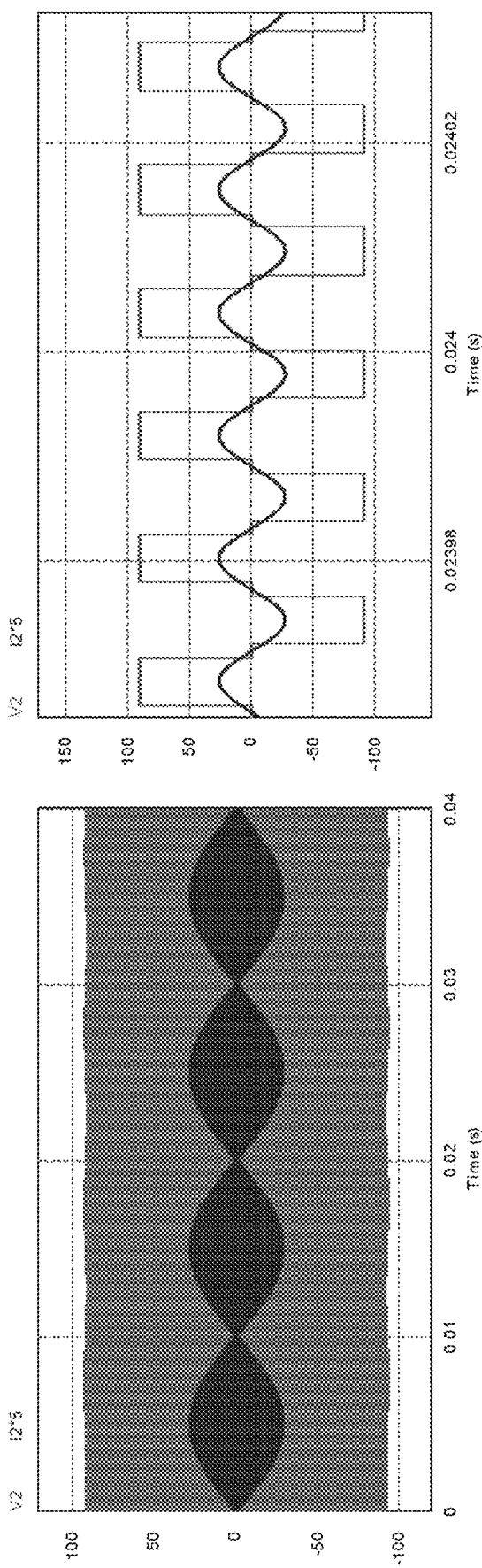
FIG. 19 shows an input voltage $V_2$, an output current $i_2$ of a rectifier of the secondary side and amplified waveforms thereof in the first power control embodiment.
Figure 20:
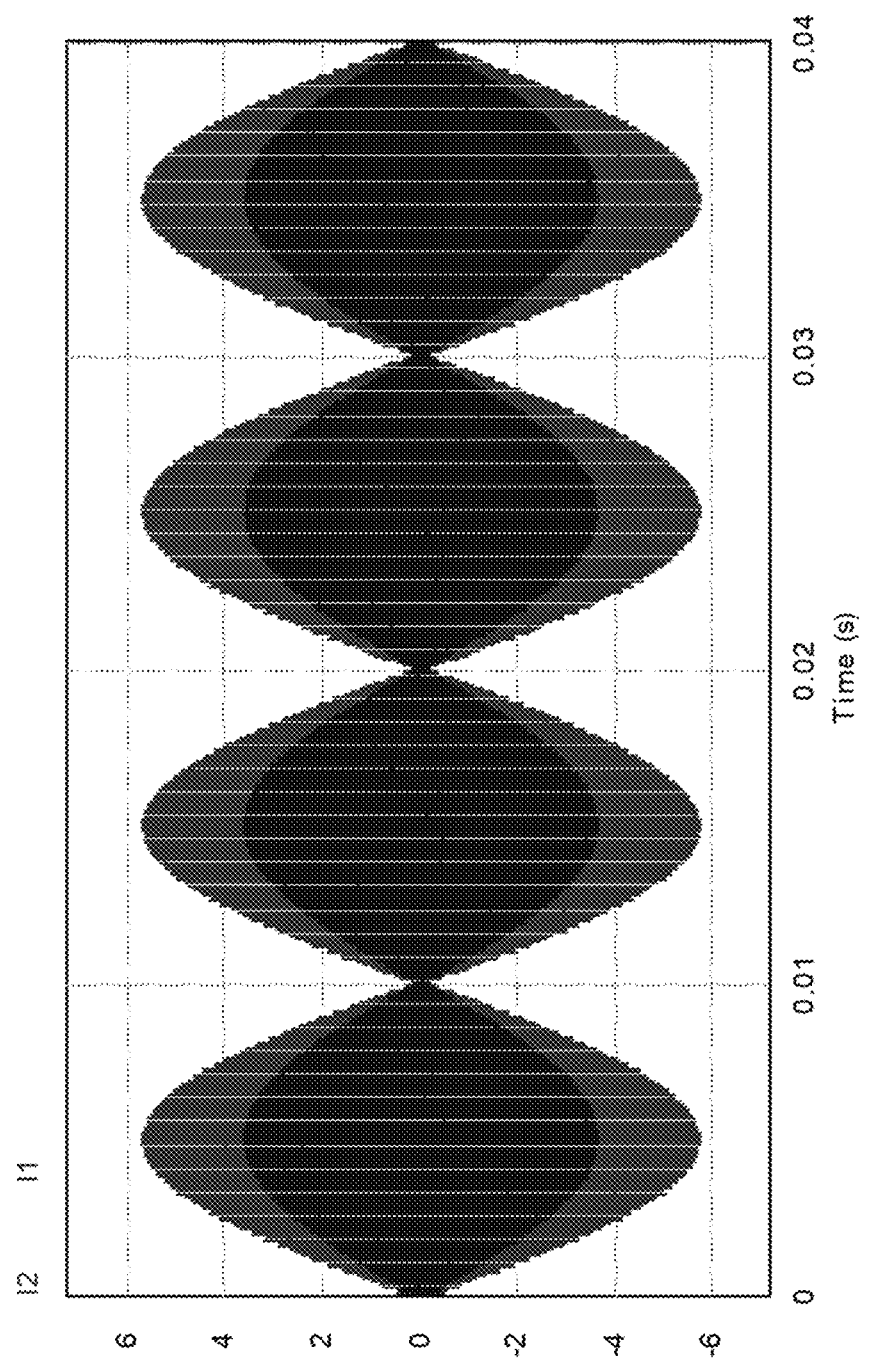
FIG. 20 shows currents $i_1$ and $i_2$ of the primary side and the secondary side in the first power control embodiment.
Figure 21:
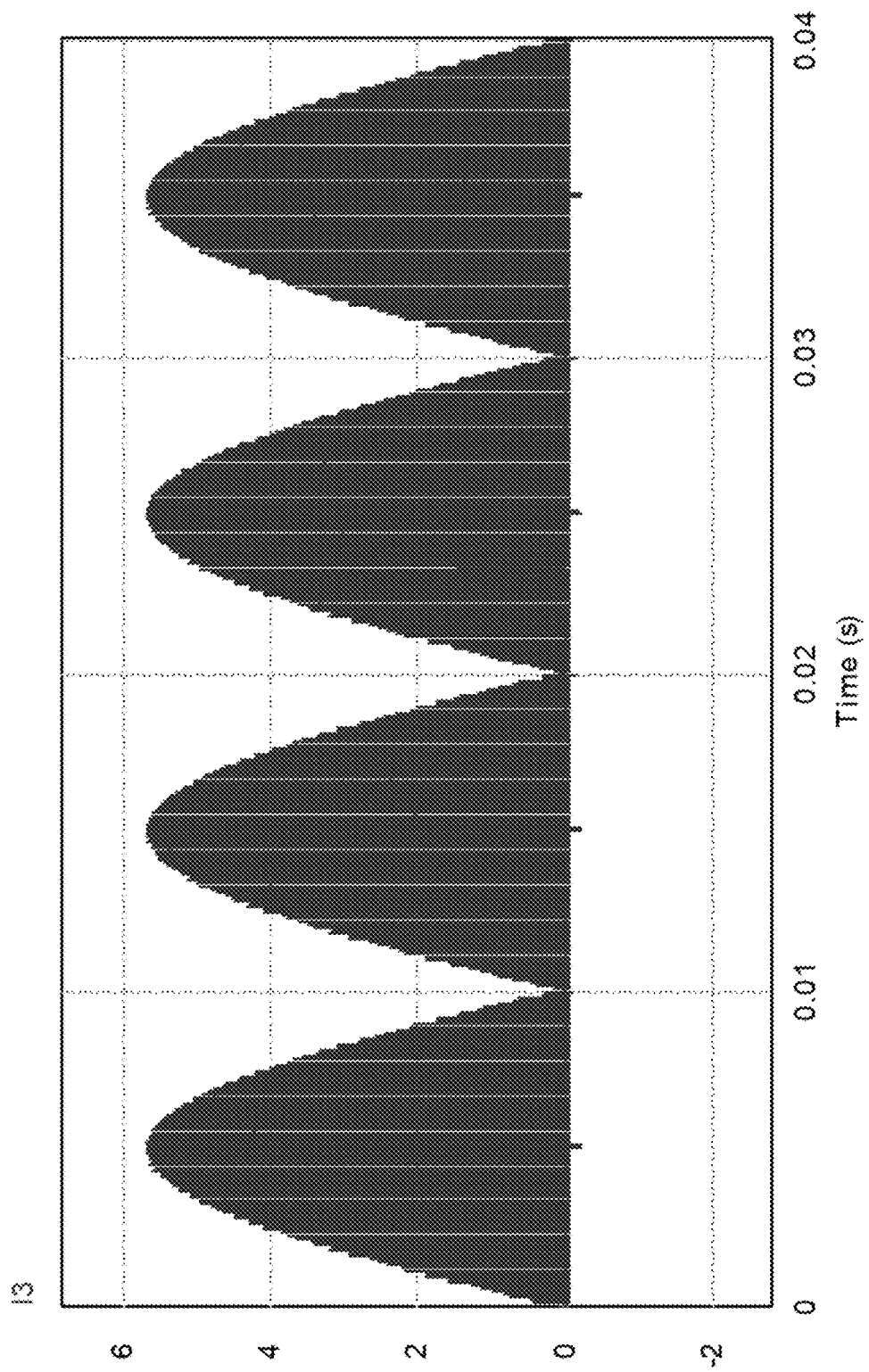
FIG. 21 shows an active rectified output current $i_3$ of the secondary side in the first power control embodiment.
Figure 22:
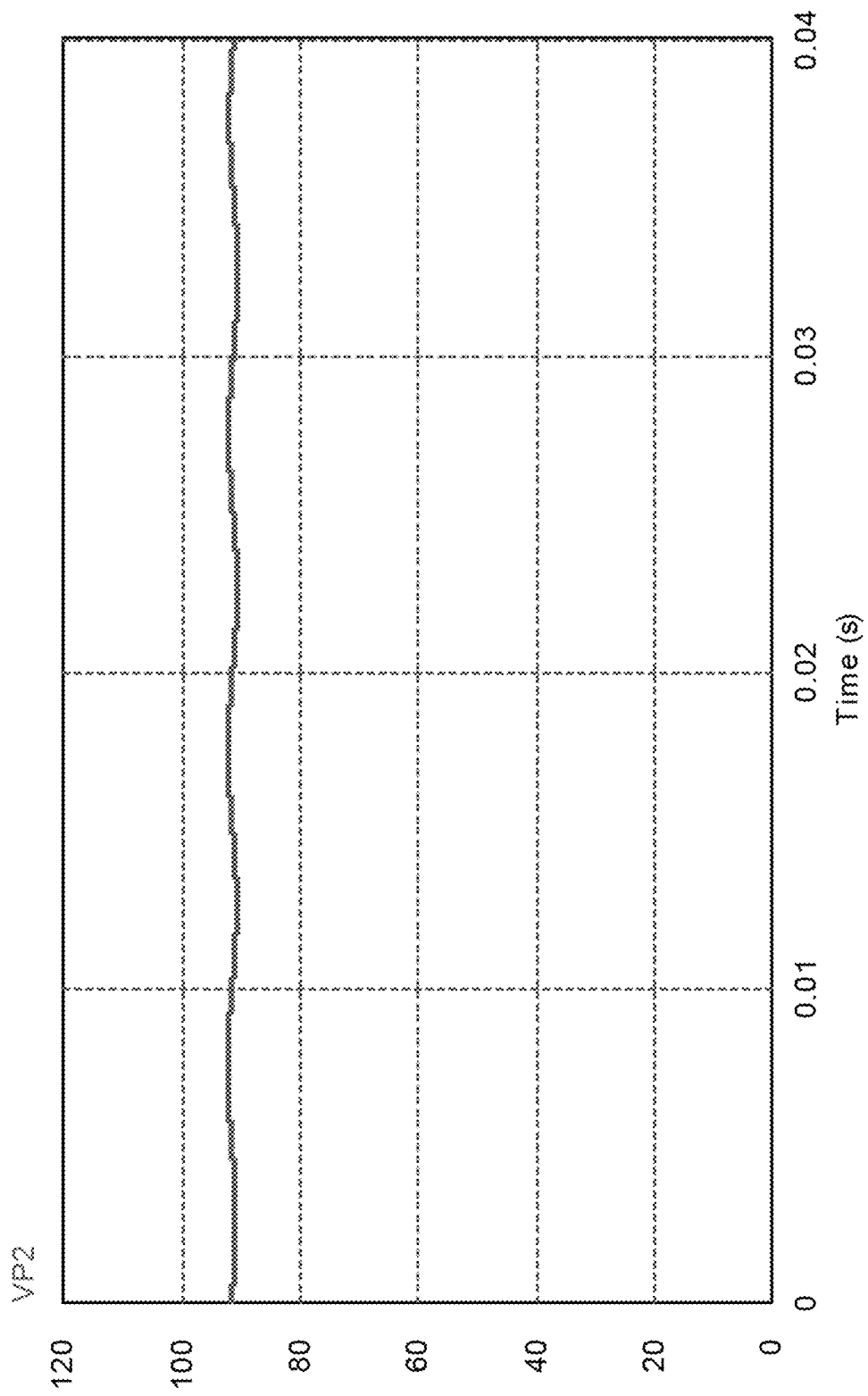
FIG. 22 shows an output DC voltage $U_O$ under the condition of a maximum output voltage in the first power control embodiment.

The input voltage and current of the grid side are shown in FIG. 16, and the power factor is 0.982. After passing through an uncontrolled rectification circuit, the voltage $v_{in}$ and current $i_{in}$ are shown in FIG. 17, both of which show a 100 Hz pulsation. The output voltage and current of the inverter are shown in FIG. 18, and the input voltage $V_2$ and current $i_2$ of the rectifier of the secondary side are shown in FIG. 19, and the voltage and current are in phase. The coil currents $i_1$ and $i_2$ of the secondary side are shown in FIG. 20. After active rectification, the current waveform $i_3$ is shown in FIG. 21, showing a pulsating form, and the output voltage is shown in FIG. 22. An average output voltage is 92V, and the peak-to-peak ratio of a ripple is 1.64%.

Scheme 2: adjust $\beta$ and keep $\alpha$ unchanged $$\alpha = 180° \tag{16}$$

$$\beta(t) = 2\arcsin\left(\frac{\sin\omega t}{2}\right) \tag{17}$$

$$\gamma(t) = 90° - \frac{\alpha}{2} + \frac{\beta(t)}{2} = \arcsin\left(\frac{\sin\omega t}{2}\right) \tag{18}$$

Figure 23:
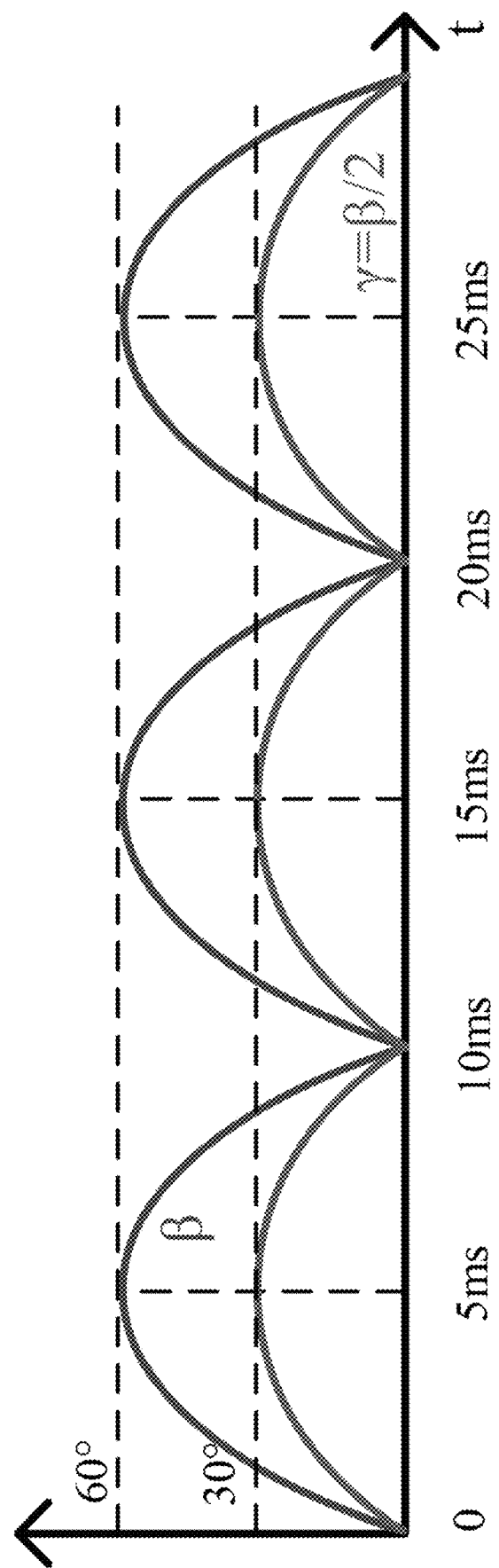
FIG. 23 shows the waveforms of $\beta(t)$ and $\gamma(t)$ in a second power control embodiment.

The waveforms of β(t) and γ(t) are as shown in FIG. 23, with a period of 100 Hz, and their approximate sinusoidal changes show a low-frequency pulsation.

The theoretical and simulation results are shown in Table 4. The output voltage of 90V is basically consistent with the simulation, and the current envelopes of the primary side and the secondary side are basically consistent, which proves that the power can be adjusted according to the scheme 2, and the theoretical derivation is correct.

TABLE 4

|  | $I_{1max}$/A | $I_{2max}$/A | Vo/V |
|---|---|---|---|
| Theory | 1.7 | 11.4 | 90 |
| Simulation | 2 | 11.3 | 91 |

Figure 24:
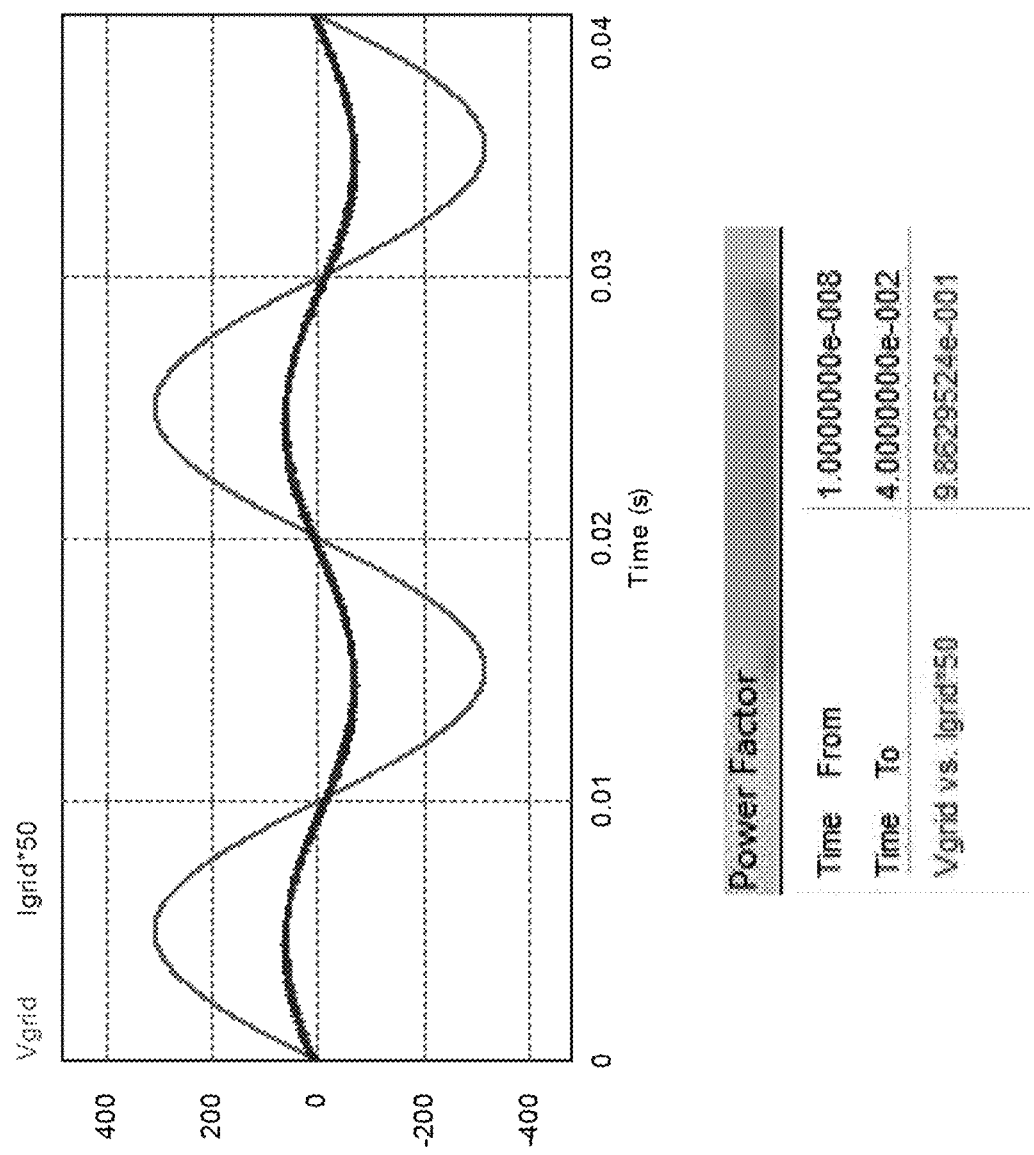
FIG. 24 shows the voltage and current ($v_{grid}$, $i_{grid}$) and a power factor thereof at the grid side in the second power control embodiment.
Figure 25:
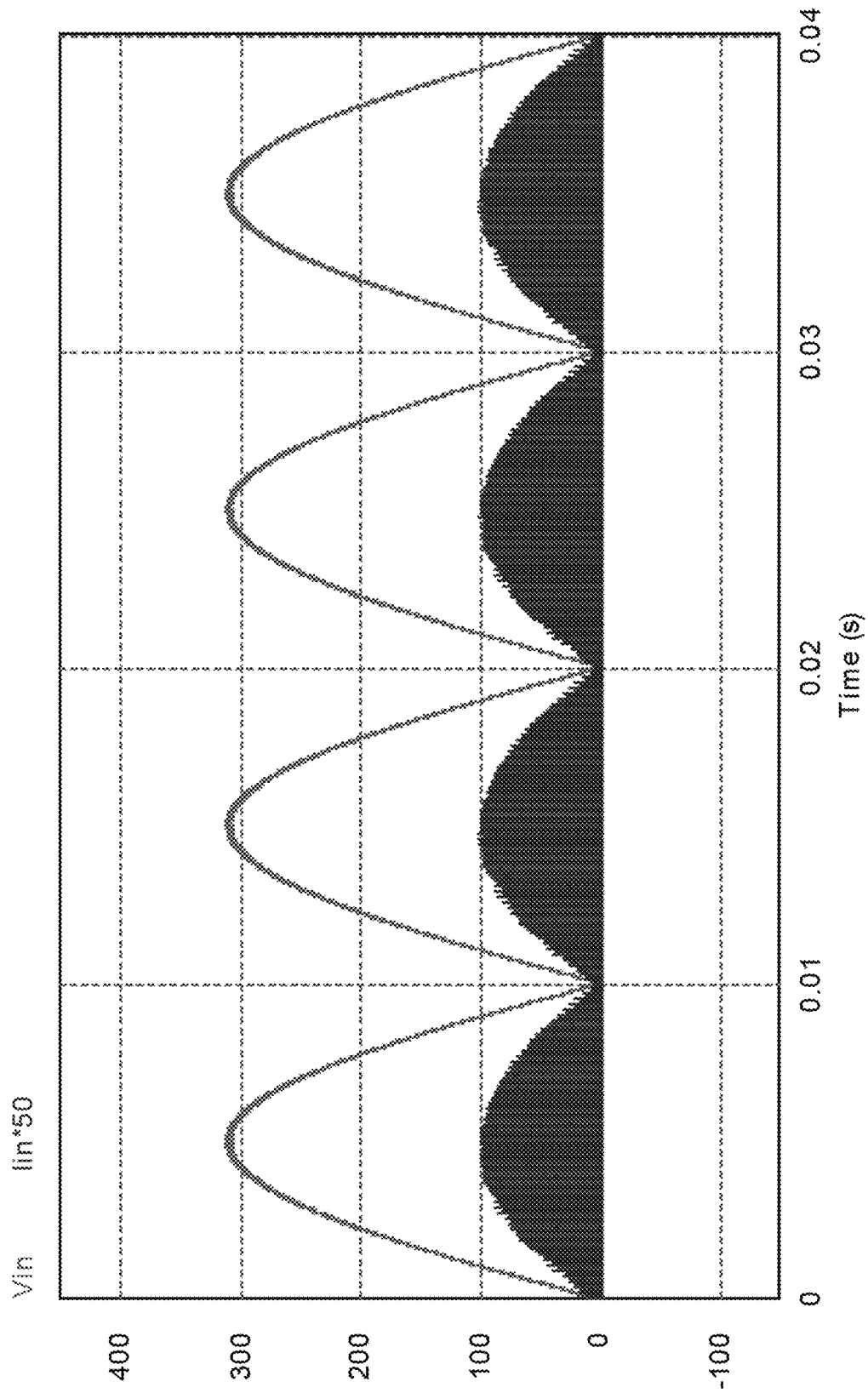
FIG. 25 shows a voltage and a current ($V_{in}$, $i_{in}$) after uncontrolled rectification in the second power control embodiment.
Figure 26:
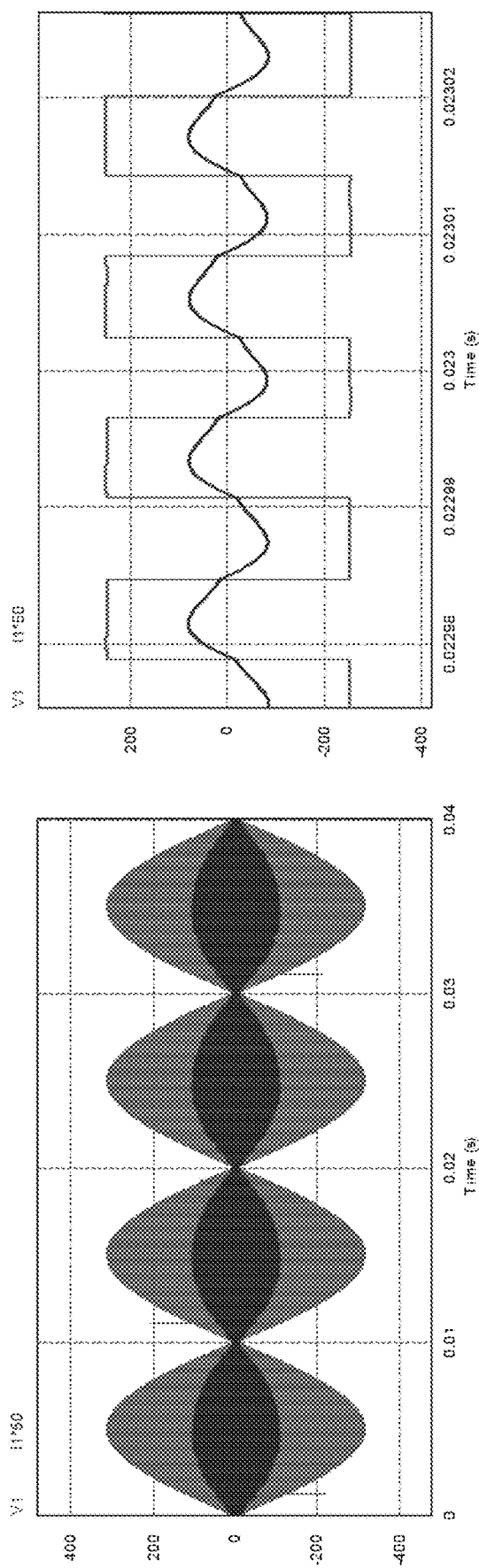
FIG. 26 shows an output voltage $V_1$, an output current $i_1$ of an inverter of a primary side and amplified waveforms thereof in the second power control embodiment.
Figure 27:
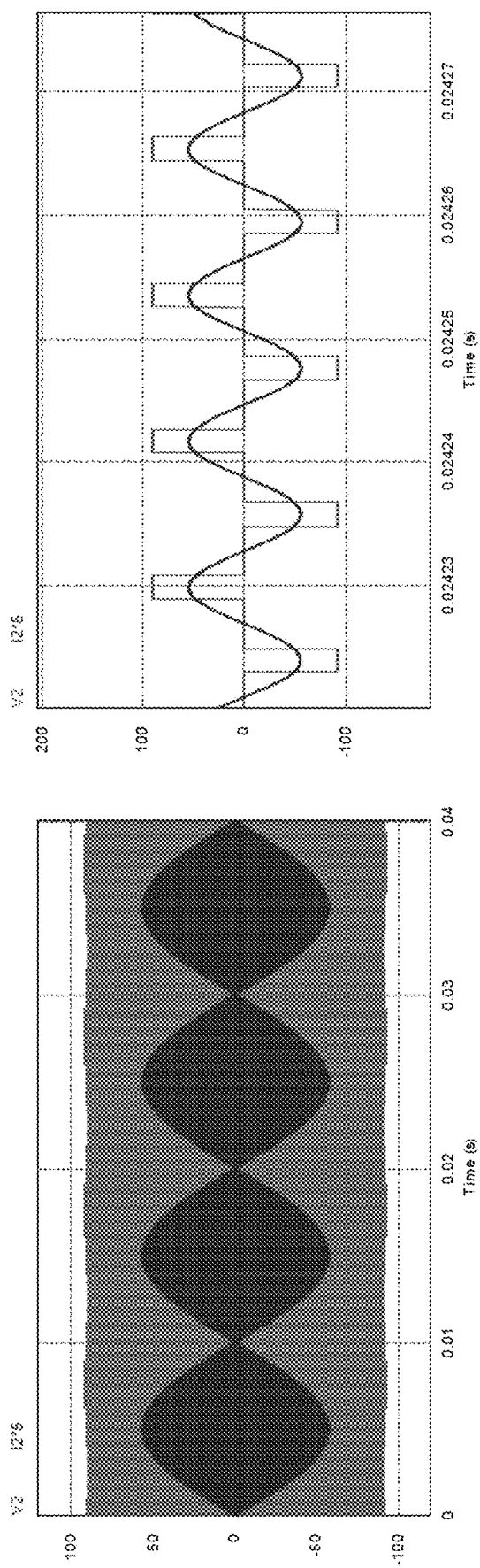
FIG. 27 shows an input voltage $V_2$, an output current $i_2$ of a rectifier of the secondary side and amplified waveforms thereof in the second power control embodiment.
Figure 28:
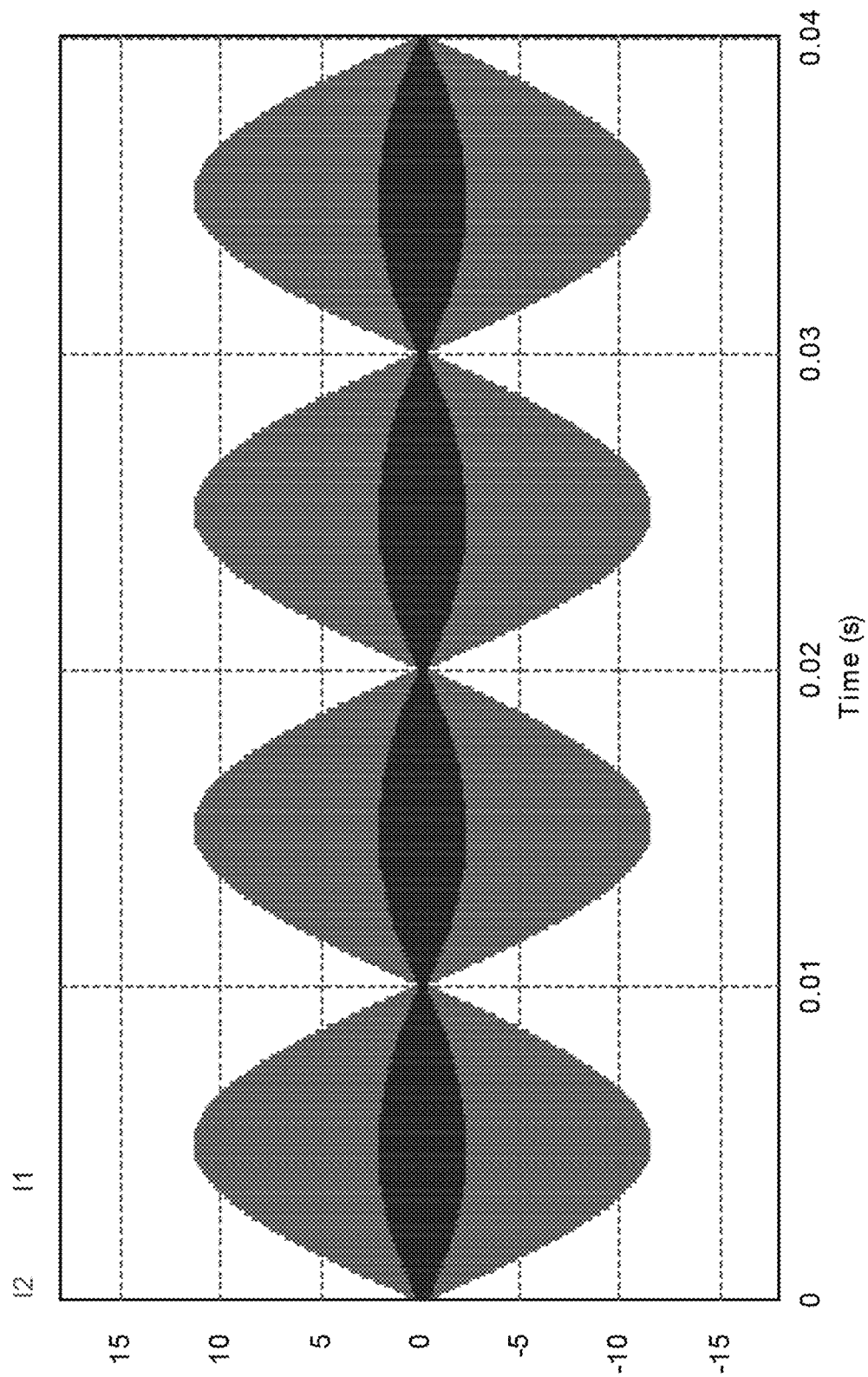
FIG. 28 shows currents $i_1$ and $i_2$ of the primary side and the secondary side in the second power control embodiment.
Figure 29:
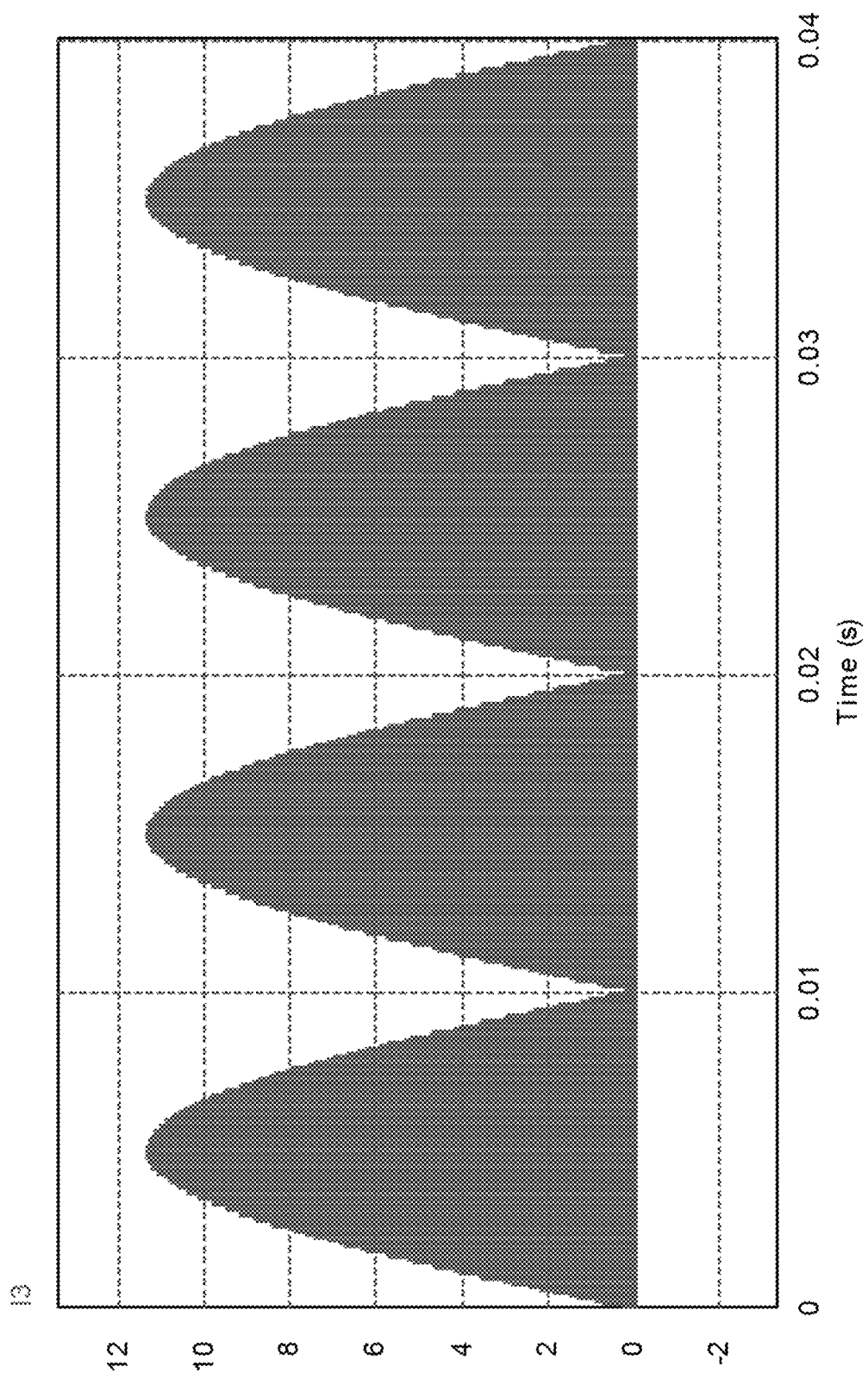
FIG. 29 shows an active rectified output current $i_3$ of the secondary side in the second power control embodiment.
Figure 30:
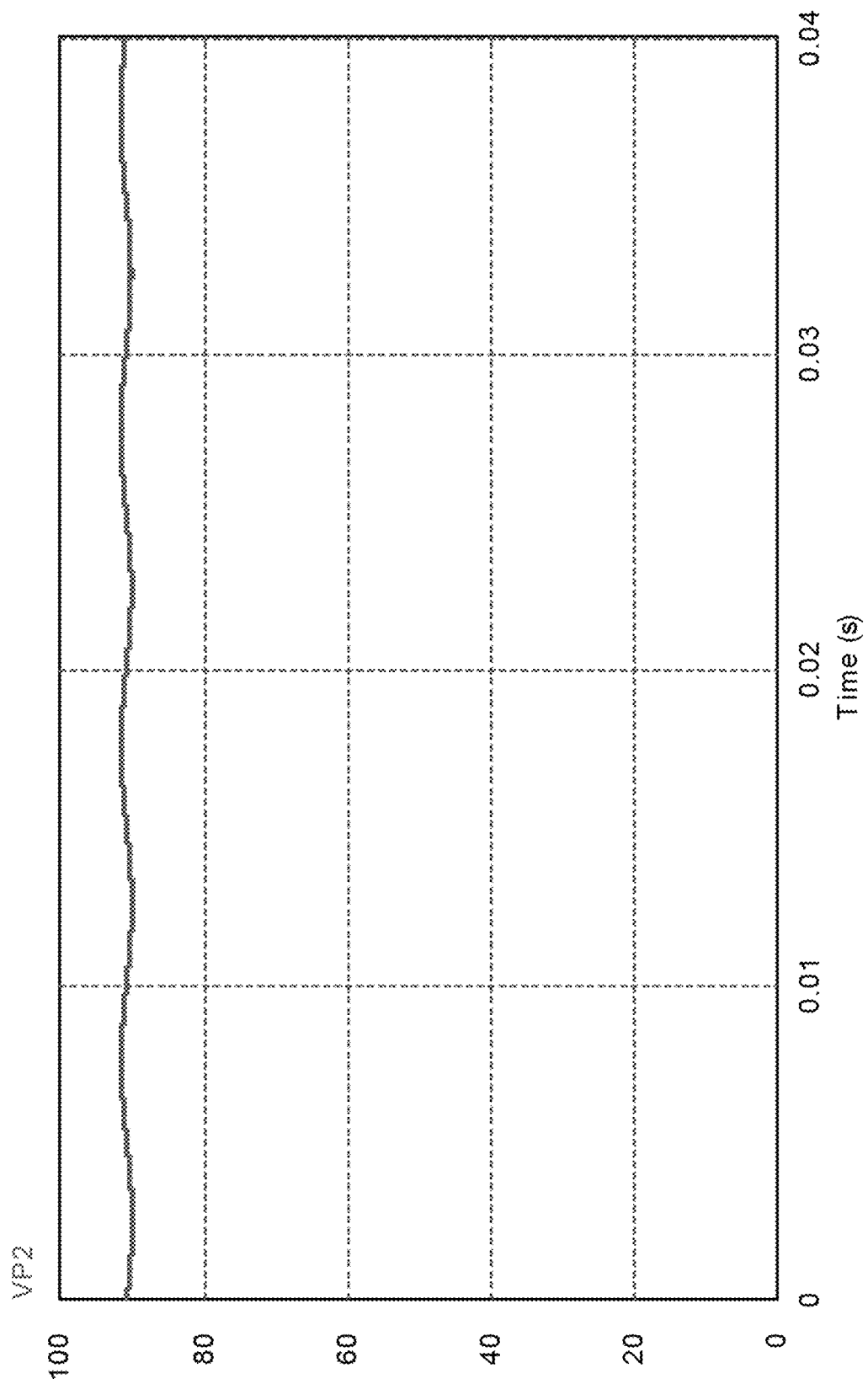
FIG. 30 shows an output DC voltage $U_O$ under the condition of a maximum output voltage in the second power control embodiment.

The input voltage and current of the grid side are shown in FIG. 24, and the power factor is 0.986. After passing through an uncontrolled rectification circuit, the voltage $v_{in}$ and current $i_{in}$ are shown in FIG. 25, in which the current $i_{in}$ at 85 kHz shows a 100 Hz pulsation. The output voltage and current of the inverter are shown in FIG. 26, and the voltage and current are in phase. The input voltage $V_2$ and current $i_2$ of the rectifier of the secondary side are shown in FIG. 27, and the voltage and current are in phase. The coil currents $i_1$ and $i_2$ of the secondary side are shown in FIG. 28. After active rectification, the current waveform $i_3$ is shown in FIG. 29, showing a pulsating form, and the output voltage is shown in FIG. 30. An average output voltage is 91V, and the peak-to-peak ratio of a ripple is 1.65%.

Scheme 3: adjust α and β

$$\alpha = 120° \quad (19)$$

$$\beta(t) = 2\arcsin\left(\frac{\sqrt{3}}{3}\sin\omega t\right) \quad (20)$$

$$\gamma(t) = 90° - \frac{\alpha}{2} + \frac{\beta(t)}{2} = 30° + \arcsin\left(\frac{\sqrt{3}}{3}\sin\omega t\right) \quad (21)$$

Figure 31:
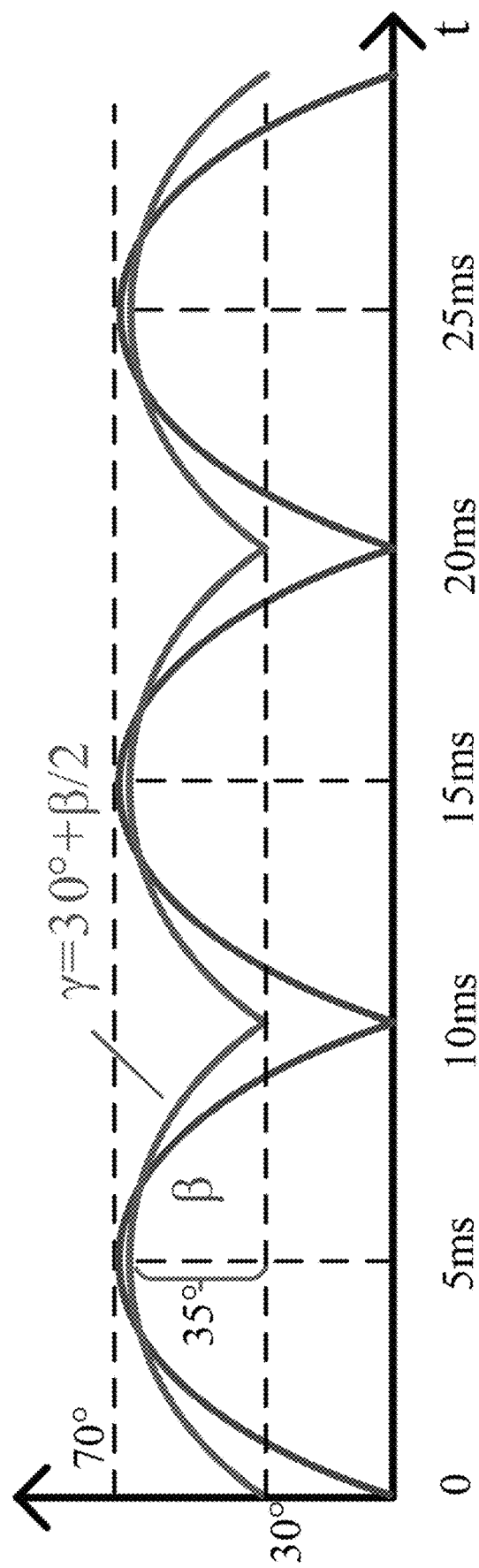
FIG. 31 shows the waveforms of $\beta(t)$ and $\gamma(t)$ in a third power control embodiment.

The waveforms of β(t) and γ(t) are as shown in FIG. 31, with a period of 100 Hz, and their approximate sinusoidal changes show a low-frequency pulsation.

The theoretical and simulation results are shown in Table 5. The output voltage of 90V is basically consistent with the simulation, and the current envelopes of the primary side and the secondary side are basically consistent, which proves that the power can be adjusted according to the scheme 3, and the theoretical derivation is correct.

TABLE 5

|  | $I_{1max}$/A | $I_{2max}$/A | $V_o$/V |
|---|---|---|---|
| Theory | 1.9 | 9.9 | 90 |
| Simulation | 2.2 | 9.8 | 92 |

Figure 32:
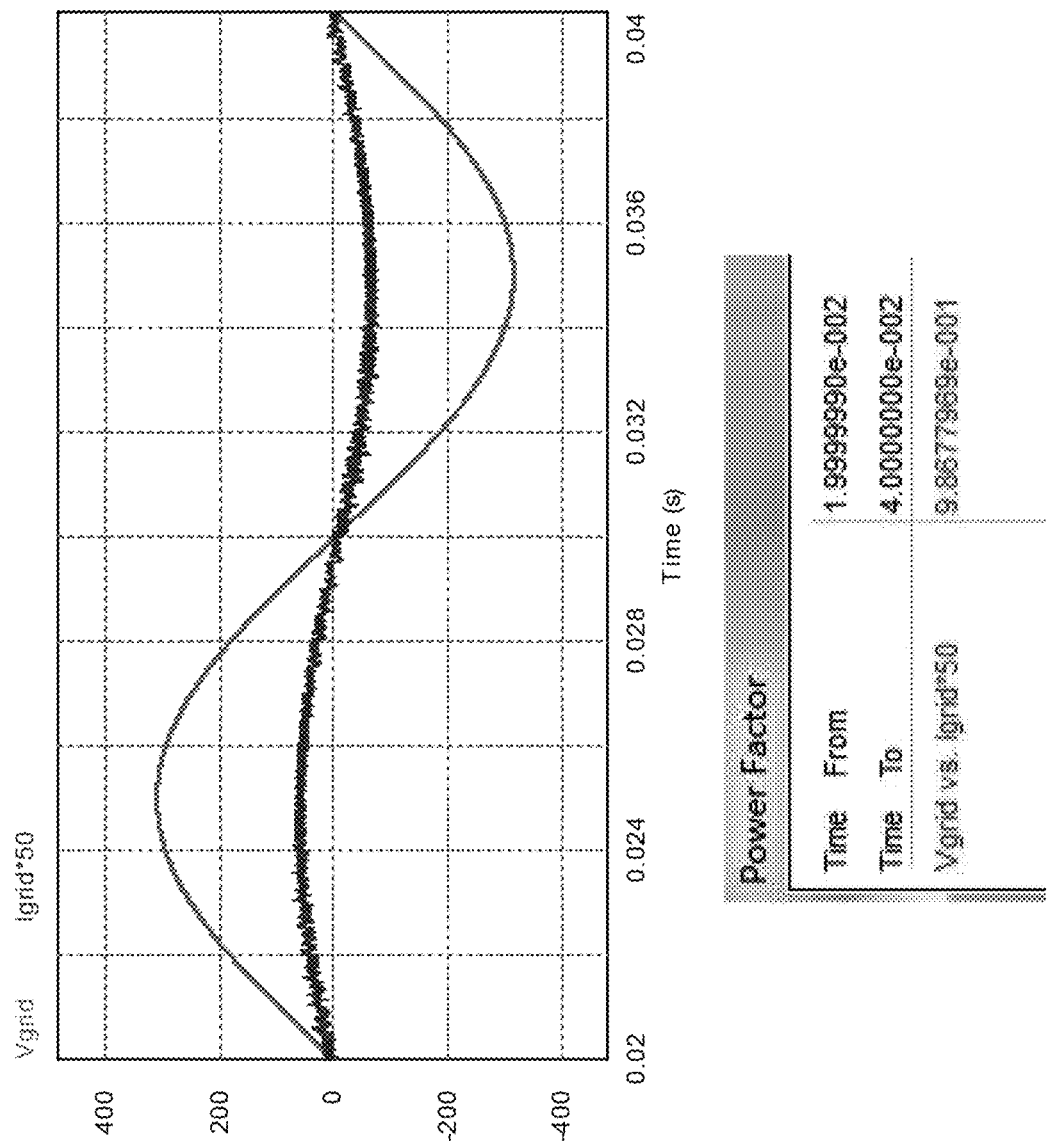
FIG. 32 shows the voltage and current ($v_{grid}$, $i_{grid}$) and a power factor thereof at the grid side in the third power control embodiment.
Figure 33:
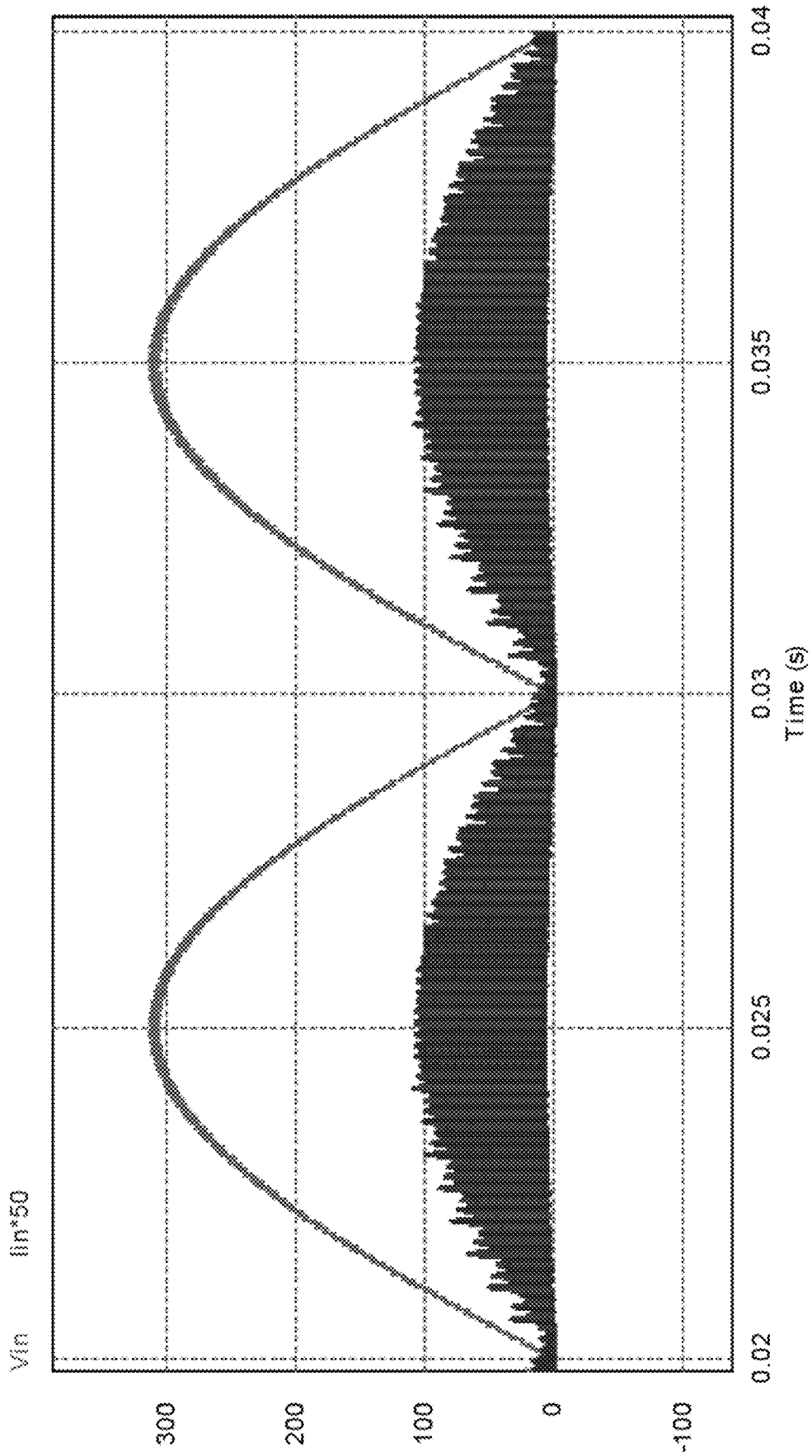
FIG. 33 shows a voltage and a current ($V_{in}$, $i_{in}$) after uncontrolled rectification in the third power control embodiment.
Figure 34:
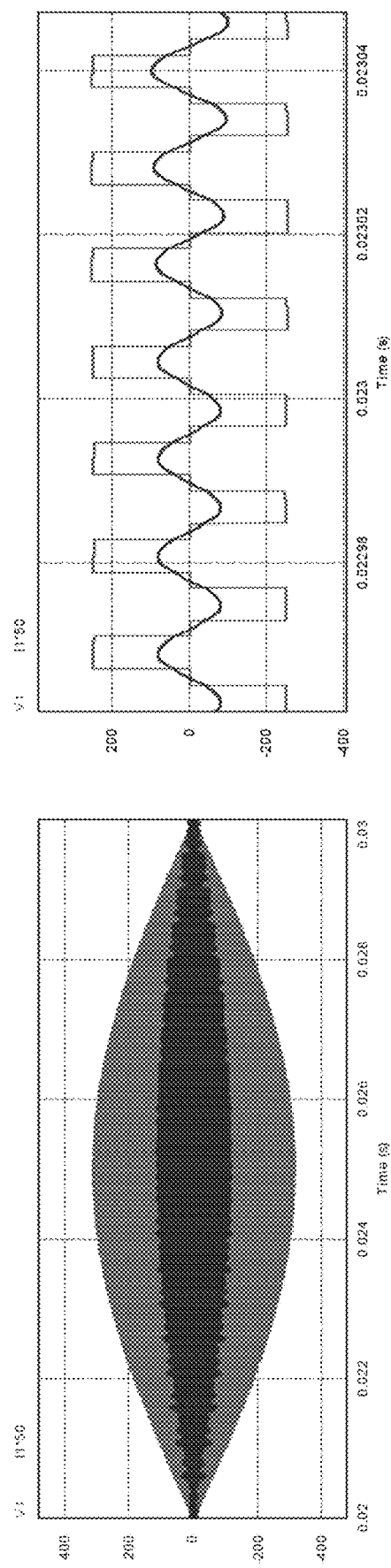
FIG. 34 shows an output voltage $V_1$, an output current $i_1$ of an inverter of a primary side and amplified waveforms thereof in the third power control embodiment.
Figure 35:
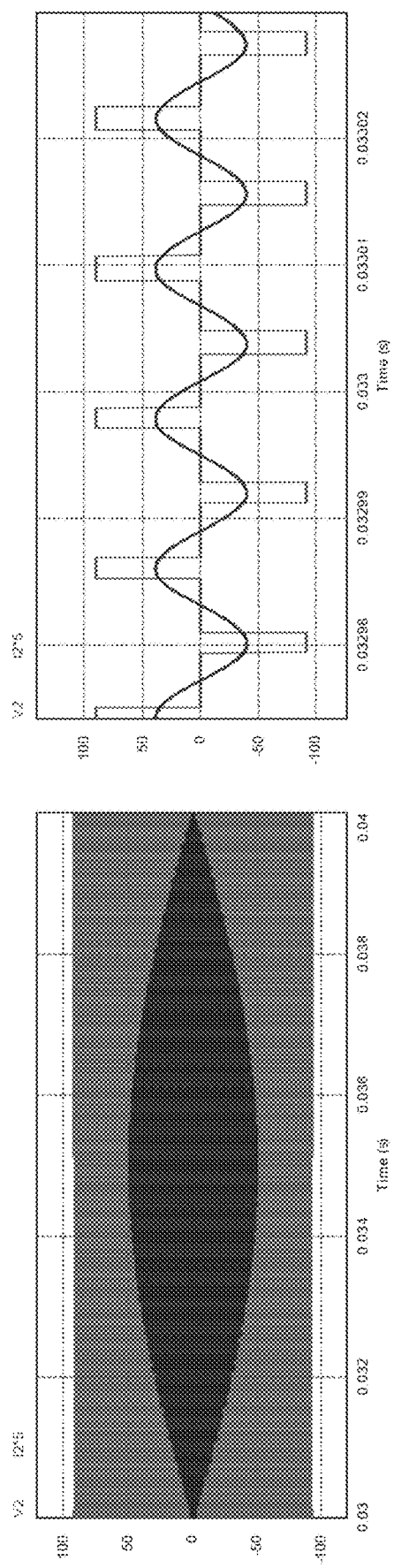
FIG. 35 shows an input voltage $V_2$, an output current $i_2$ of a rectifier of the secondary side and amplified waveforms thereof in the third power control embodiment.
Figure 36:
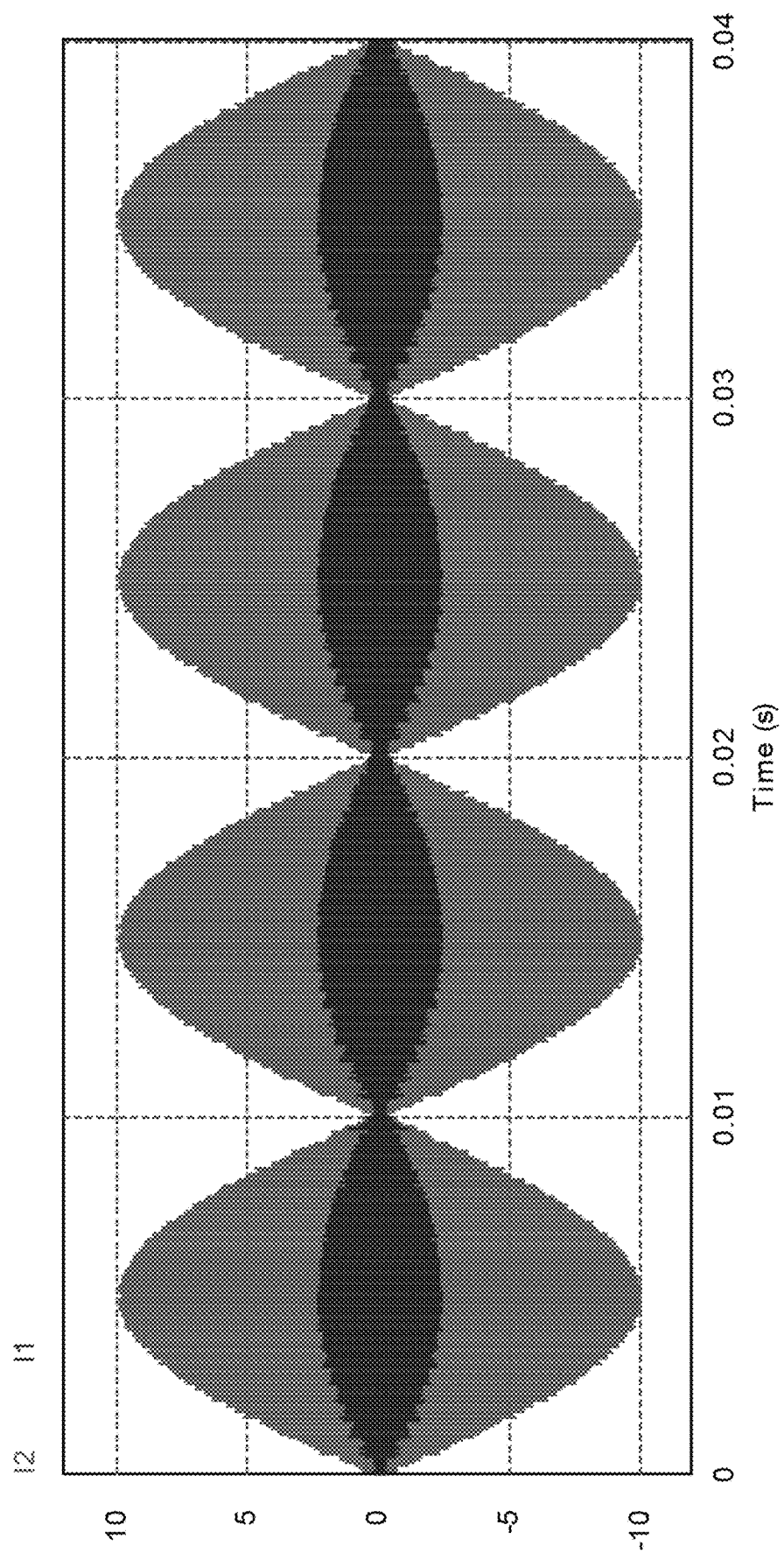
FIG. 36 shows currents $i_1$ and $i_2$ of the primary side and the secondary side in the third power control embodiment.
Figure 37:
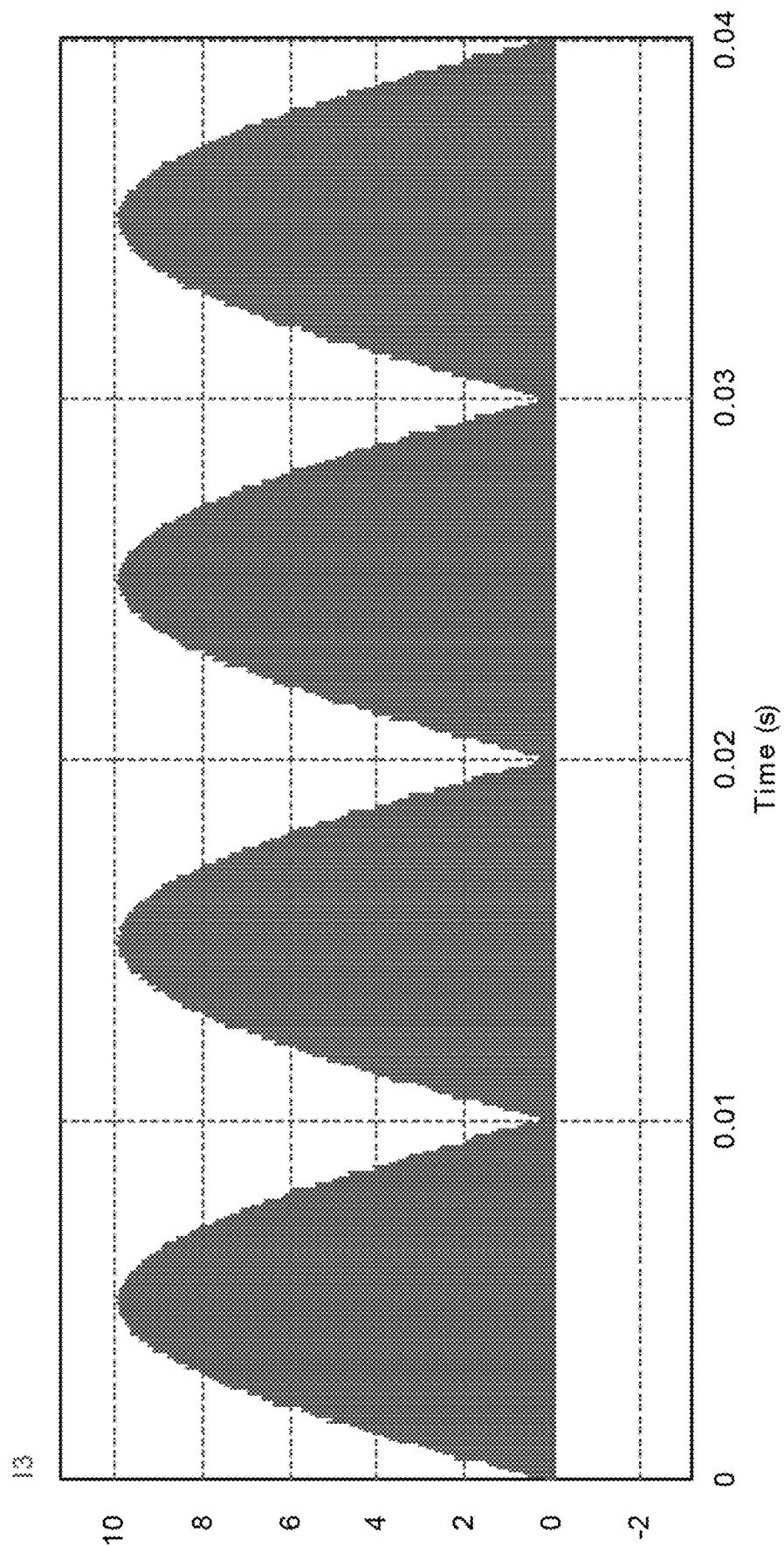
FIG. 37 shows an active rectified output current $i_3$ of the secondary side in the third power control embodiment.
Figure 38:
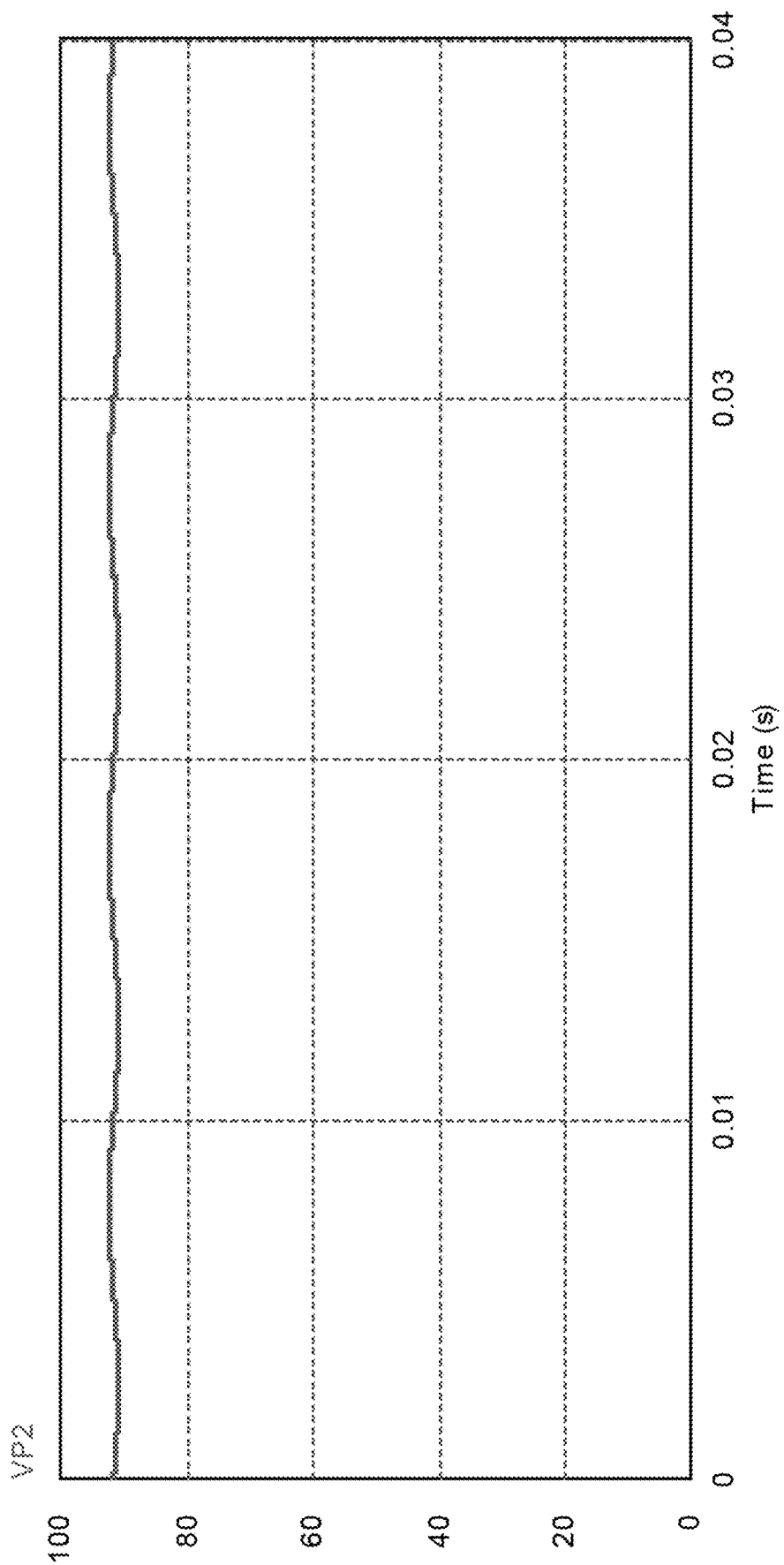
FIG. 38 shows an output DC voltage $U_O$ under the condition of a maximum output voltage in the third power control embodiment.

The input voltage and current of the grid side are shown in FIG. 32, and the power factor is 0.987. After passing through an uncontrolled rectification circuit, the voltage $v_{in}$ and current $i_{in}$ are shown in FIG. 33, in which the current $i_{in}$ at 85 kHz shows a 100 Hz pulsation. The output voltage and current of the inverter are shown in FIG. 34, both the output voltage $V_1$ and current $i_1$ of the inverter show a 100 Hz pulsation, and the modulation frequency is 85 kHz, and the voltage and current are in phase. The voltage $V_2$ and current $i_2$ at the input end of the rectifier of the secondary side are shown in FIG. 35, both showing a 100 Hz pulsation, and the modulation frequency is 85 kHz. The phase shift angle of the voltage V2 is modulated and changed in real time, and the voltage and current are in the same phase. Secondary coil currents i1 and I2 are shown in FIG. 36. After active rectification, the current waveform i3 is shown in FIG. 37, showing a pulsating form, and the output voltage is shown in FIG. 38, with an average value of 92V.

What is claimed is:

1. A wireless electric energy transmission system for realizing power factor correction (PFC) through secondary side modulation, the wireless electric energy transmission system comprising a primary side and a secondary side, the primary side is coupled through coils to the secondary side, the primary side comprises:
    an electromagnetic interference (EMI) filter connected to a grid, and
    a rectifier bridge configured to convert a grid voltage into a 100 Hz voltage and directly supply power to an inverter in the primary side, wherein a PFC circuit is not included in the primary side, and
the secondary side comprises:
    an active full-bridge rectifier configured to perform a PFC function,
wherein the PFC function is achieved only through the secondary side modulation, and
wherein the PFC function comprises three control degrees of freedom, which, in sequence, are:
    a phase shift angle α of the inverter of the primary side,
    a phase shift angle β of the active full-bridge rectifier of the secondary side, and
    a phase shift angle γ of a control voltage $u_{gs5}$ of a top tube of a first bridge arm of the active full-bridge rectifier of the secondary side is ahead of a control voltage $u_{gs1}$ of a top tube of a first bridge arm of the inverter of the primary side,
wherein the phase shift angle α of the inverter of the primary side is given and the phase shift angle β of the active full-bridge rectifier of the secondary side is regulated according to the following formula:

$$\beta(t) = 2\arcsin\left(\frac{\pi}{4} \cdot \frac{V_O}{R_L} \cdot \frac{\pi\omega_0 M}{220\sqrt{2} \cdot \sin\frac{\alpha}{2}}\sin\omega t\right)$$

where, $V_O$ is an output DC voltage, $R_L$ is an equivalent load resistance of an output end, $\omega_0=2\pi f_0=2\pi \cdot 85$ kHz is a resonance angular frequency of the wireless electric energy transmission system, $\omega=2\pi f=2\pi \cdot 50$ kHz is a grid voltage angular frequency of the wireless electric energy transmission system, and M is a mutual inductance value of the coils of the primary side and the secondary side; and
wherein the phase angle γ is regulated according to the following formula:

$$\gamma(t) = 90^0 - \frac{\alpha}{2} + \frac{\beta(t)}{2}$$

where, a 50 Hz harmonic wave of an input current of the rectifier bridge of the primary side is in phase with the grid voltage, after being filtered through the EMI filter, and a voltage-current power factor of a grid side is approximately 1.

* * * * *